(12) United States Patent
Ninomiya et al.

(10) Patent No.: US 6,451,967 B1
(45) Date of Patent: Sep. 17, 2002

(54) METHOD OF DRYING SAPONIFIED ETHYLENE-VINYL ACETATE COPOLYMERS

(75) Inventors: Kenji Ninomiya, Ibaraki; Sinji Miyake; Makoto Kunieda, both of Kurashiki, all of (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/664,331

(22) Filed: Sep. 18, 2000

(30) Foreign Application Priority Data

| Sep. 20, 1999 | (JP) | ............ 11-264732 |
| Nov. 5, 1999 | (JP) | ............ 11-314800 |
| Nov. 5, 1999 | (JP) | ............ 11-314801 |
| Nov. 5, 1999 | (JP) | ............ 11-314802 |

(51) Int. Cl.$^7$ .............. C08F 6/28; C08F 6/26; C08F 6/00; C08F 6/04; C08F 210/02
(52) U.S. Cl. .............. 528/503; 264/176.1; 264/177.19; 264/204; 264/209.7; 525/330.4; 525/330.5; 525/330.6; 528/480; 528/487; 528/488; 528/489; 528/490

(58) Field of Search .................. 264/176.1, 177.19, 264/204, 209.7; 525/330.4, 330.5, 330.6; 528/480, 487, 488, 489, 490, 503

(56) References Cited

U.S. PATENT DOCUMENTS

| 4,151,134 A | * | 4/1979 | McClain ............... 524/394 |
| 4,820,803 A | * | 4/1989 | McClain ............... 528/487 |
| 4,921,907 A | * | 5/1990 | Negi et al. ............. 525/57 |
| 5,460,760 A | * | 10/1995 | Tsai et al. ............. 264/39 |

FOREIGN PATENT DOCUMENTS

| JP | 61-4752 | 1/1986 |

* cited by examiner

*Primary Examiner*—Rabon Sergent
(74) *Attorney, Agent, or Firm*—Armstrong, Westerman & Hattori, LLP

(57) ABSTRACT

A method of drying saponified ethylene-vinyl acetate copolymers which includes melting and kneading a mixture including one or more saponified ethylene-vinyl acetate copolymer species and having a water content of 5 to 60% by weight until the mixture has a water content of less then 5% by weight.

14 Claims, No Drawings

METHOD OF DRYING SAPONIFIED ETHYLENE-VINYL ACETATE COPOLYMERS

BACKGROUND OF THE INVENTION

1. Field of the Invention

The present invention relates to a method of drying one or more saponified ethylene-vinyl acetate copolymers.

Hereinafter, an ethylene-vinyl acetate copolymer is sometimes referred to also as EVA and a saponified ethylene-vinyl acetate copolymer as EVOH for short.

2. Prior Art

Owing to its characteristics such as transparency, antistatic properties, oil resistance, solvent resistance, gas barrier and aroma-retaining properties, EVOH has so far been widely used for various packaging and other purposes. In a general process for producing such EVOH, an ethylene-vinyl acetate copolymer, in the form of a solution in an alcohol, for instance, is saponified and the saponification product is then extruded, in a strand form, into a coagulation bath, followed by cutting (pelletizing) and further followed by washing with water, among others, to give hydrous pellets, which are generally dried to give a pellet-form product.

When, however, such drying is insufficient, melt molding of EVOH (in pellet form) using an extruder or the like may fail to give moldings satisfactory in appearance and performance characteristics because of the occurrence of foaming, among others. Thus, drying of such EVOH (pellets) is very important but, as far as such drying is concerned, the current situation is that wet EVOH is treated generally with hot air at a high temperature in the order of 100° C. for ten-odd hours (e.g. JP Kokai S53-119958).

To insure improved heat-stretching characteristics, a resin composition comprising a blend of two or more EVOH species has been proposed (JP Kokai S60-173038, JP Kokai S63-1996645, JP Kokai S63-230757, JP Kokai S63-264656, JP Kokai H02-261847) and, for such blending, it is common practice that EVOH species of drastically reduced water content as prepared by hot air-drying at a high temperature as mentioned above are melt-blended by means of an extruder or the like. Further, in JP Kokai S61-4752, there is a description to the effect that two ethylene-vinyl acetate copolymers are mixed together each in the state of a methanol solution and the n saponified and, after solvent removal, the saponification product is dried. In JP Kokai H05-200865, an examples describes a procedure comprising blending two EVOH species (with hydrotalcite dispersed therein) together in the presence of a methanol/water mixed solvent, then removing the solvent and drying the mixture.

However, the above methods, which use hot air, may possibly cause discoloration (yellowing) of EVOH and thus decrease the commercial value thereof. As for the efficiency of drying, a long period of treatment is required, hence the efficiency is not always good. A novel improvement in the method of drying hydrous EVOH is thus desired.

Further, the methods of obtaining EVOH blends which comprise melt blending-together EVOH species dried with hot air at high temperatures, as mentioned above, indeed improve the heat-stretch moldability of the blend to a certain extent but, since the blend is composed of EVOH species differing in composition and structure, the compatibility therebetween is not high enough to result in complete homogeneity so that the product quality is apt to be influenced by fluctuations in extrusion conditions and heat-stretch molding conditions. Therefore, in the continuous stretch-molding of films, cups, trays, bottles and the like, the incidence of rejects is inevitable. On the other hand, if the efficiency of kneading within the extruder is increased (under high temperature and high shear conditions) for improving the uniformity of the blend, thermal deterioration of EVOH becomes inevitable and thus the resulting blend may possibly be discolored (yellowed), causing a decrease in commercial value. As for production efficiency, a prolonged time is required for the treatment of EVOH with hot air, so that the efficiency is not necessarily high.

As regards the method described in JP Kokai S61-4752 (method comprising mixing in solution form, followed by saponification) too, a certain extent of improvement is indeed produced with respect to thermal deterioration and uniformity of the blend of two or more EVOH species but hot air drying is eventually necessary, hence there still remains a worry about thermal deterioration, although this depends on the heating conditions in the step of drying. Further, the blend cannot be said to have sufficient homogeneity and it was found that there is room for improvement in heat stretchability (continuous moldability) as well.

As regards the method described in JP Kokai H05-200865 (solution blending method), a certain extent of improvement is indeed observed with respect to thermal deterioration and uniformity of the blend of two or more EVOH species but hot air drying is eventually necessary, hence there still remains a worry about thermal deterioration, although this depends on the heating conditions in the step of drying. Further, the blend cannot be said to have sufficient homogeneity and it was found that there is room for improvement in heat stretchability (continuous moldability) as well.

It is an object of the present invention to provide an industrially advantageous method of drying hydrous EVOH or hydrous EVOH compositions. Another object is to provide, by said method, molding resins which hardly cause troubles in melt molding thereof with respect to the continuous moldability thereof as well as the quality of moldings obtained therefrom.

SUMMARY OF THE INVENTION

The method of drying saponified ethylene-vinyl acetate copolymers (EVOH species) is characterized by melting and kneading one or more EVOH species with a water content of 5 to 60% by weight until a water content of less than 5% by weight.

The above method preferably comprises mixing two or more EVOH species, each in solution, together and coagulating/precipitating the same as a saponified ethylene-vinyl acetate copolymer mixture with a water content of 5 to 60% by weight and then melting and kneading the same until a water content of less than 5% by weight.

Also preferably, the method comprises mixing two or more ethylene-vinyl acetate copolymer (EVA) species, each in solution, together, saponifying the same, then coagulating/precipitating the resulting EVOH species as a mixture with a water content of 5 to 60% by weight and melting and kneading the same until a water content of less than 5% by weight.

DETAILED DESCRIPTION OF THE INVENTION

In the following, the present invention is described in detail.

(Ethylene-vinyl Acetate Copolymer (EVA))

The saponified ethylene-vinyl acetate copolymer (EVOH) species to be used in the practice of the present invention are prepared by saponifying ethylene-vinyl acetate copolymer (EVA) species in solution. Therefore, the EVA species are described first.

The ethylene-vinyl acetate copolymers can be produced by any known polymerization process, for example by solution polymerization, suspension polymerization or emulsion polymerization.

The ethylene-vinyl acetate copolymers (EVA species) are not particularly restricted as to the compositions thereof. Considering the performance characteristics required of the EVOH or EVOH composition obtained therefrom, however, the ethylene content of the EVA species is preferably 5 to 70 mole percent (more preferably 20 to 60 mole percent, in particular 25 to 55 mole percent). When such ethylene content is less than 5 mole percent, the water resistance, high humidity gas barrier properties and melt moldability of the product EVOH species will be low, At a higher ethylene content than 70 mole percent, the EVOH products will unfavorably have no sufficient gas barrier properties.

Furthermore, the EVA species should be such that the EVOH species obtained by saponification thereof have an intrinsic viscosity (as determined in a mixed solvent composed of 85% by weight of phenol and 15% by weight of water at 30° C.) of 0.6 to 1.5 dl/g, preferably 0.7 to 1.3 dl/g, more preferably 0.8 to 1.2 dl/g. When such viscosity is less than 0.6 dl/g or in excess of 1.5 dl/g, the extrusion moldability may unfavorably become unstable.

Such ethylene-vinyl acetate copolymers (EVA species) may contain, in addition to ethylene and vinyl acetate, any of other ethylenically unsaturated monomers copolymerizable therewith. As such other monomers, there may be mentioned olefins such as propylene, 1-butene and isobutene, unsaturated acids such as acrylic acid, methacrylic acid, crotonic acid, phthalic acid (anhydride), maleic acid (anhydride) and itaconic acid (anhydride), salts thereof or mono- or di-$C_{1-18}$ alkyl esters thereof, acrylamides such as acrylamide, N—$C_{1-18}$ alkylacrylamides, N,N-dimethylacrylamide, 2-acrylamidopropanesulfonic acid or salts thereof, acrylamidopropyldimethylamine or acid salts or quaternary salts thereof, methacrylamides such as methacrylamide, N—$C_{1-18}$ alkylmethacrylamides, N,N-dimethylmethacrylamide, 2-methacrylamidopropanesulfonic acid or salts thereof, methacrylamidopropyldimethylamine or acid salts or quaternary salts thereof, N-vinylamides such as N-vinylpyrrolidone, N-vinylformamide and N-vinylacetamide, cyanovinyl compounds such as acrylonitrile and methacrylonitrile, vinyl ethers such as $C_{1-18}$ alkyl vinyl ethers, hydroxyalkyl vinyl ethers and alkoxyalkyl vinyl ethers, vinyl halides such as vinyl chloride, vinylidene chloride, vinyl fluoride, vinylidene fluoride and vinyl bromide, vinylsilanes such as trimethoxyvinylsilane, allyl acetate, allyl chloride, allyl alcohol, dimethylallyl alcohol, trimethyl(3-acrylamido-3-dimethylpropyll)ammonium chloride, acrylamido-2-methylpropanesulfonic acid and the like. These may be post-modified, for example by urethane formation, acetalization or cyanoethylation, to an extent such that the effects of the present invention are not yet nullified.

In solution preparation, the ethylene-vinyl acetate copolymers may be dissolved in any solvent capable of dissolving them. While the solvent and method of dissolution are not particularly restricted, mention may be made of such solvents as methanol, ethanol, propanol, butanol, phenol, xylene, toluene, dimethyl sulfoxide (DMSO), dimethylformamide (DMF), hexafluoroisopropanol (HFIP) and the like as well as water containing these solvents (mixed solvents). From the industrial viewpoint, alcohols are preferred, however, and methanol is most preferred.

In mixing two or more ethylene-vinyl acetate copolymer (EVA) species together in a solution state, the method of mixing includes, but is not limited to, 1) the method which comprises introducing two or more solid EVA species combinedly into a solvent to thereby effect dissolution and mixing, 2) the method which comprises dissolving at least one EVA species in a solvent beforehand and introducing another or other solid EVA species into the solution to effect dissolution and mixing and 3) the method which comprises dissolving two or more EVA species separately in a solvent beforehand and mixing the resulting solutions together. From the industrial viewpoint, the method 3) is judiciously employed. In particular, from the productivity viewpoint, it is advantageous to mix up those solutions which are derived from the reaction mixture solutions in methanol, for instance, as obtained from the ethylene-vinyl acetate copolymerization reaction step, by removing the unreacted monomers (ethylene and vinyl acetate) by a per se known method.

The method of mixing up such solutions is not particularly restricted but the EVA solutions may be mixed up in a per se known rotary type mixing/stirring vessel or line mixer or the like. In the step of such mixing, it is desirable that the respective solutions to be mixed up be adjusted to 40 to 110° C. and then mixed up. At a temperature below 40° C., the viscosities of the solutions may become so high that uniform mixing may become difficult to attain. Conversely, a temperature exceeding 110° C. is undesirable, since the mixed solution may be discolorated.

In mixing two or more EVA species together, the mixing weight ratio therebetween is not particularly restricted but, in the case of mixing two EVA species (A) and (B) together, the weight ratio (A)/(B) is preferably 99/1 to 1/99 (more preferably 95/5 to 5/95, still more preferably 90/10 to 10/90). When such mixing weight ratio is outside the above range, the effects (appearance, gas barrier properties and continuous moldability in heat and stretch molding) of blending according to the present invention may not be fully produced; this is unfavorable.

In mixing three or more EVA species together, the weight ratio is preferably such that, after saponification, the weight ratio of one EVOH species (A) to the other two or more EVOH species (collectively, B) may amount to 9/2 to 2/98 (more preferably 90/10 to 10/90, still more preferably 80/20 to 20/80). (Saponified ethylene-vinyl acetate copolymer (EVOH))

The above solution containing an ethylene-vinyl acetate copolymer (EVA) or a mixture of EVA species is then saponified. The saponification of such EVA species is carried out in the presence of an alkali catalyst. The alkali catalyst may be any of those known in the art to be useful in alkali-catalyzed saponification of polyvinyl acetate and ethylene-vinyl acetate copolymers. As specific examples, there may be mentioned alkali metal hydroxides such as sodium hydroxide, potassium hydroxide and lithium hydroxide, alkali metal alocholates such as sodium methylate and tert-butoxypotassium, strongly basic amines, typically 1,8-diazabicyclo[5,4,10]undecene-7 (DBU), and, further, alkali metal carbonates and alkali metal hydrogen carbonates. From the ease of handling and economy viewpoint, however, the use of sodium hydroxide is preferred.

The catalyst is used in an amount of not more than 0.05 equivalent, preferably not more than 0.03 equivalent, relative to the acetate group remaining in EVA, although the amount may vary according to the required degree of saponification and the reaction temperature, among others. It is also possible to use an acid catalyst, such as hydrochloric acid or sulfuric acid, in lieu of the alkali catalyst.

In carrying out saponification, the resin concentration in the above EVA solution is generally adjusted to about 20 to 60% by weight, the alkali catalyst or acid catalyst is then added and the reaction is effected under the following conditions: temperature 40 to 140° C., pressure 1 to 15 kg/cm$^2$ G. Addition of an aliphatic polyhydric alcohol, such as glycerol, ethylene glycol or hexanediol, is also desirable for making it possible to conduct the saponification reaction stably.

When care is taken so that the EVOH species or EVOH composition after the reaction at the above solution temperature does not precipitate out, the EVOH concentration in the resultant mixture is not particularly restricted but, generally, an EVOH concentration of 10 to 55% by weight, preferably 15 to 50% by weight, is recommended.

The apparatus in which the saponification reaction is carried out is not particularly restricted but the saponification reaction can be carried out either batchwise or continuously using any reaction vessel known in the art. From the productivity and quality stability viewpoint, however, it is desirable to carry out the saponification reaction continuously using a plate column, such as a perforated plate tower or a bubble cap tower. Thus, the saponification reaction can be carried out in an industrially favorable manner by feeding a solution containing one or more EVA species to the upper part of the above tower reactor, feeding the alkalic catalyst (or acid catalyst) in the same manner, and blowing methanol in vapor form into the tower from the lower part thereof. The methanol vapor and byproduct methyl acetate vapor are taken out of the system from the top of the tower, and the saponification reaction product, namely EVOH, is discharged from the tower bottom as a methanol solution. The saponification reaction can be conducted not only in such a continuous manner using a tower reactor but also in a batchwise manner using, for example, a reaction vessel equipped with a stirrer.

The EVOH species or EVOH composition obtained by such saponification preferably has a degree of saponification of the vinyl acetate component of not less than 85 mole percent, more preferably 90 to 99.5 mole percent, in particular 95 to 99.5 mole percent. When the saponification degree is less than 85 mole percent, the water resistance will be insufficient and the heat stability of the EVOH species or EVOH composition in melt molding will be poor. Conversely, a saponification degree exceeding 99.5 mole percent is undesirable since it may lead to a poor improving effect on the heat-stretch moldability of the EVOH composition.

The solution of the EVOH species or EVOH composition in an alcohol, for instance, as obtained in the above manner is then prepared for strand production. While the solution may be used as such, its composition is preferably adjusted by directly adding water to the solution or adding water after adequate concentration or dilution of the EVOH solution. In the case of an aqueous solution, it is desirable, from the solution stability viewpoint, that the water/alcohol mixing ratio be within the range of 80/20 to 5/95 by weight and the alcohol content A (% by weight) satisfy the relation 2.55E−40.75$\leq$A$\leq$2.55E−10.75 (where E is the average ethylene content (mole percent) of the EVOH species) and, considering the stability in the subsequent coagulation operation, it is desirable that the EVOH content in the solution be 20 to 55% by weight (more preferably 25 to 50% by weight.

In preparing an EVOH solution in a mixed solvent composed of water and an alcohol, it is in particular desirable that the EVOH solution in a water-alcohol mixed solvent be prepared so that the water content may satisfy the relation shown below, since, then, the EVOH blend obtained shows good homogeneity. In other words, water is added in an amount selected so as to satisfying the following relation according to the ethylene content in EVOH:

$$0.0933 \times (50-X)^2 + 26 \geq Y \geq 0.0933 \times (50-X)^2 + 6 \qquad (3)$$

where X denotes the ethylene content (mole percent) and Y denotes the water content (% by weight) of the water-alcohol mixed solvent in the EVOH solution.

The thus-obtained EVOH solution or EVOH composition solution in a water-alcohol mixed solvent is then brought into contact with a coagulating or solidifying medium, whereby the EVOH species or EVOH composition precipitates out to give the desired EVOH species or EVOH composition. The process therefor is not particularly restricted but, generally, such mixed solution is introduced into a coagulating bath for causing the EVOH species or EVOH composition to precipitate out (coagulate) there.

As the coagulating medium for such precipitation, use is made of water or water-alcohol mixed solvents, aromatic hydrocarbons such as benzene, ketones such as acetone and methyl ethyl ketone, ethers such as dipropyl ether, and organic acid esters such as methyl acetate, ethyl acetate and methyl propionate, among others. Water or a water-alcohol mixed solvent is preferred, however, because of ease of handling. Said alcohol includes methanol, ethanol, propanol and so on. Industrially, methanol is preferably used. It is desirable that this alcohol be the same as that in the above-mentioned alcohol-containing EVOH solution.

The weight ratio between the coagulating medium or solution and the EVOH strands in the coagulation bath (coagulant/EVOH strand ratio) is preferably 50 to 10,000, more preferably 100 to 1,000. By selecting that weight ratio within the above range, it becomes possible to obtain EVOH pellets or EVOH composition pellets which are uniform in size distribution.

Further, it is also desirable that the coagulating medium contain 1 to 10,000 ppm of a carboxylic acid and/or 1 to 15,000 ppm of a carboxylic acid salt and/or 1 to 50,000 ppm of a carboxylic acid ester, more preferably 50 to 5,000 ppm of a carboxylic acid and/or 10 to 5,000 ppm of a carboxylic acid salt and/or 10 to 10,000 ppm of a carboxylic acid ester. By causing the coagulating medium to contain a carboxylic acid and/or carboxylate in the above concentration range, it becomes easier to obtain EVOH pellets uniform in size distribution.

Such carboxylic acid includes, but is not limited to, formic acid, acetic acid, propionic acid, oxalic acid, mralonic acid, succinic acid, glutaric acid, adipic acid, crotonic acid, maleic acid, itaconic acid and the like. Among them, acetic acid is preferred.

Such carboxylic acid salt includes, but is not limited to, sodium formate, potassium formate, magnesium formate, calcium formate, sodium acetate, potassium acetate, magnesium acetate and the like. Preferred among them is sodium acetate.

Such carboxylic acid ester includes, but is not limited to, methyl formate, ethyl formate, propyl formate, methyl acetate, ethyl acetate, propyl acetate, methyl propionate, ethyl propionate, methyl acetoacetate, ethyl acetoacetate and the like. Methyl acetate is preferred, however.

From the precipitability viewpoint, the temperature of the coagulation bath is preferably −10° C. to 40° C., more preferably 0° C. to 20° C. To operate at a low temperature, if possible, is effective in reducing the resin loss.

The EVOH species or EVOH composition is thus precipitated in the coagulation bath. In the step of such precipitation, the EVOH solution is generally extruded into the coagulation bath in the form of a strand through a nozzle having an arbitrary shape and size and, after precipitation, the strand is cut to pellet-like pieces, which are then preferably washed with water.

The shape and size of the nozzle are not particularly restricted but, from the industrial viewpoint, a cylindrical shape is preferred and the length thereof is preferably 1 to 100 cm, more preferably 3 to 30 cm, with a preferred inside diameter of 0.1 to 10 cm, more preferably 0.2 to 5.0 cm.

It is not always necessary that the number of strands is one. It is also possible to extrude an arbitrary number of strands, say several to several hundred strands, simultaneously.

Preferred as the shape of pellets is a cylindrical shape having a diameter of 1 to 10 mm (more preferably 2 to 6 mm) and a length of 1 to 10 mm (more preferably 2 to 6 mm) or a spherical shape having a diameter of 1 to 10 mm (more preferably 2 to 6 mm) in view of the stability in the step of melt kneading.

As regards the water washing conditions, the pellets are washed with water in a water bath maintained at a temperature of 10 to 40° C. (preferably 20 to 40° C.). Upon such water washing treatment, oligomers and impurities are removed from the EVOH pellets. It is also desirable that, following the water washing treatment, or in lieu of the water washing treatment, the pellets be treated with an aqueous solution containing any of various acids or metal salts to cause the pellets to contain the acid or metal salt, whereby the color tone, heat stability, long run moldability, interlaminar adhesion (with an adhesive resin in laminate manufacture) and heat-stretch moldability, among others, of the EVOH pellets after drying can be improved. As such acid component, there may be mentioned organic acids such as acetic acid, propionic acid, butyric acid, lauric acid, stearic acid, oleic acid and behenic acid and inorganic acids such as sulfuric acid, sulfurous acid, carbonic acid, boric acid and phosphoric acid and, as the metal salt, there may be mentioned metal salts of the above acids, for example alkali metal salts, alkaline earth metal salts and transition metal salts. In particular, acetic acid, phosphoric acid and boric acid, and alkali metal salts and alkaline earth metal salts thereof are preferred because of their excellent effects.

The content of acetic acid is preferably selected within the range of 5 to 1,000 ppm (more preferably 10 to 500 ppm, in particular 20 to 300 ppm) on the dried EVOH basis. When the acetic acid content is less than 5 ppm, the effect of its use may not be obtained to a satisfactory extent. Conversely, at a content exceeding 1,000 ppm, the long run moldability may unfavorably decrease.

The content of phosphoric acid is preferably selected within the range of 5 to 1,000 ppm (more preferably 10 to 500 ppm, in particular 20 to 300 ppm) as the phosphate radical on the dried EVOH basis. When the phosphoric acid content is less than 5 ppm, the effect of its use may not be obtained to a satisfactory extent. Conversely, at a content exceeding 1,000 ppm, the moldings obtained may unfavorably have a deteriorated appearance.

The content of boric acid is preferably selected within the range of 10 to 10,000 ppm (more preferably 20 to 2,000 ppm, in particular 100 to 1,000 ppm) as boron radical on the dried EVOH basis. When the boric acid content is less than 10 ppm, the effect of its use may not be obtained to a satisfactory extent. Conversely, at a content exceeding 10,000 ppm, the moldings obtained may unfavorably have a deteriorated appearance.

The content of the metal salt is preferably selected within the range of 5 to 1,000 ppm (more preferably 10 to 500 ppm, in particular 20 to 300 ppm) as the metal on the dried EVOH basis. When the metal salt content is less than 5 ppm, the effect of its use may not be obtained to a satisfactory extent. Conversely, at a content exceeding 1,000 ppm, the moldings obtained may unfavorably have a deteriorated appearance. When two or more alkali metal and/or alkaline earth metal salts are contained in the EVOH species, it is desirable that the total content be within the above range.

(Adjustment of Water Content and Reduction in Water Content (Drying))

In accordance with the present invention, the water content of the EVOH species precipitated in a pellet form and washed with water in such a manner as mentioned above should be adjusted to 5 to 60% by weight (preferably 10 to 50% by weight, more preferably 10 to 40% by weight) and then the water content of the resulting pellets or the like should be reduced to less than 5% by weight by melt kneading. Such points are described below.

The method of adjusting the water content of the EVOH species to 5~60 weight % is not particularly restricted but it is possible to adjust said water content by adjusting various conditions in the above-mentioned process of extruding the EVOH solution into a coagulating medium in a strand-like form to thereby cause coagulation, cutting the strand to pellets or the like and washing the same with water. When such water content is less than 5% by weight, the drying effect of the invention and/or the effects of the technique of blending according to the present invention (continuous moldability, discoloration prevention and production efficiency in heat-stretch molding) cannot be materialized to the full. Conversely, at a water content exceeding 60% by weight, water partially separates from the resin during melt kneading and the condition of melt kneading becomes unstable, with the results that the objects of the present invention cannot be accomplished.

The "water content" of the EVOH species before drying treatment (and after drying treatment as well) so referred to herein is measured and calculated in the following manner.

[Measurement of Water Content]

An EVOH sample is weighed (W1 grams) on an electronic force balance and then placed in a hot air oven type drier maintained at 150° C. and, after 5 hours of drying and 30 minutes of allowing to cool in a desiccator, the sample is weighed in the same manner (W2 grams) and the water content is calculated as follows:

$$\text{Water content } (\%) = [(W1 - W2)/W1] \times 100 \qquad (3)$$

The hydrous EVOH pellets to be used in the practice of the present invention are obtained in the above manner. From the stability in melt kneading viewpoint, it is also desirable that, when necessary for water content adjustment, for instance, the EVOH pellets or the like be subjected to a per se known drying treatment (e.g. hot air drying, drying by dielectric heating, drying by microwave heating) prior to the drying treatment proper according to the present invention or the surface water be removed from the hydrous pellets beforehand.

The EVOH species or EVOH composition adjusted to a water content of 5 to 60% by weight is then subjected to melt kneading. The melt kneading can be carried out using a known melt kneading apparatus, for example a melt extruder, kneader extruder, mixing roll, Banbury mixer or plastomill. Generally, however, a single or twin screw extruder is preferably used from the industrial viewpoint. Considering the stability in melt kneading and the homogeneity of blends, the use of a two screw extruder is particularly preferred. In the following, the method of the present invention which uses such twin screw extruder is described in further detail.

The twin screw extruder to be used is not particularly restricted but preferably has an inside diameter of not less than 20 mm (more preferably 30 to 150 mm). An inside diameter of less than 20 mm is undesirable because of low productivity. The ratio L/D is preferably 20 to 80 (more preferably 30 to 60). An L/D ratio less than 20 may lead to an insufficient drying capacity. Conversely, at a ratio exceeding 80, the resin residence time in the extruder is unnecessarily prolonged and the possibility of thermal deterioration unfavorably increases. The occurrence of one or more vents, preferably two or more vents, is desirable and, from the drying efficiency and product resin quality viewpoint, it is desirable that at least one of them be suctioned under reduced pressure. The shape and size of the die opening are not critical but, for obtaining pellets appropriate in shape and size, it is desirable that the die opening have a circular shape with a diameter of 1 to 7 mm (more preferably 2 to 5 mm). From the production viewpoint, the number of such openings is preferably about 3 to 100 (more preferably 10 to 50). Further, for foreign matter removal and resin pressure stabilization (stabilization of extrusion), it is also desirable that at least one (preferably two or more) mesh-like screen be provided between the extruder and die inlet and, considering the extrusion stability, it is further desirable that a gear pump and/or a heat exchanger be provided.

In carrying out the melt kneading, it is desirable, though not always necessary, that the cylinder temperature ($T_I$) at the hopper opening and the cylinder temperature ($T_O$) at the outlet of the extruder be selected so as to satisfy the relation defined by the formula (1) shown below. When the ratio $T_O/T_I$ is less than 1.1, the drying capacity may be insufficient or the extrusion may become unstable. Conversely, at a $T_O/T_I$ ratio of 10 or higher, the quality of the EVOH may be sacrificed (heat deterioration) or the extrusion may become unstable, which is unfavorable. It is more desirable that the conditions defined by the formula (1') shown below, in particular the conditions defined by the formula (1") shown below, be satisfied. The "cylinder temperature" means the actually measured temperature of the cylinder.

$$1.1 \leq T_O/T_I < 10 \tag{1}$$

$$1.5 \leq T_O/T_I < 8 \tag{1'}$$

$$1.8 \leq T_O/T_I < 5 \tag{1''}$$

(where $T_O$ and $T_I$ are in °C.).

Generally, the extruder cylinder is heated by means of a plurality of heaters. In the case of an eight division system, the extruder cylinder is provided with eight heaters from the hopper opening (resin feeding portion) to the extruder outlet (resin discharge port, die-connecting part) and it is possible to set the temperature of each heater independently. Thus, when the temperatures set for the respective heaters are represented by C1, C2, C3, . . . , C7 and C8 in the above order, C1 is the cylinder temperature at the hopper opening and C8 is the cylinder temperature at the outlet of the extruder.

Further, it is particularly desirable that the feeding zone temperature ($T_F$) and the metering zone temperature ($T_M$) of the extruder be set so as to satisfy the conditions defined by the formula (2) shown below. When the ratio $T_M/T_F$ is less than 1.1, the drying capacity may be insufficient and/or the extrusion may become unstable. Conversely, at a ratio of 10 or higher, the quality of the EVOH may be sacrificed (heat deterioration) or the extrusion may become unstable, which is unfavorable. It is more desirable that the conditions defined by the formula (2') shown below, in particular the conditions defined by the formula (2") shown below, be satisfied.

$$1.1 \leq T_M/T_F < 10 \tag{2}$$

$$1.2 \leq T_M/T_F < 9 \tag{2'}$$

$$1.3 \leq T_M/T_F < 8 \tag{2''}$$

(where $T_M$ and $T_F$ are in °C.).

The "feeding zone" so referred to herein means one third of the extruder cylinder barrel on the hopper inlet side when said cylinder barrel is divided into three equal parts in the length direction and the "metering zone" means one third of said barrel on the extruder outlet side. The "feeding zone temperature ($T_F$)" is the mean of the temperatures (actual measured values) at the sites of those divisional heaters which are completely included in the former one third segment of the cylinder barrel and the "metering zone temperature ($T_M$) is the mean of the temperatures (actual measured values) at the sites of those divisional heaters which are completely included in the latter one third segment of the cylinder barrel.

The cylinder temperatures and the feeding zone and metering zone temperatures are adjusted as mentioned above. Generally, these temperatures are selected preferably within the range of room temperature to 300° C. (more preferably 50 to 280° C.).

The EVOH melted under the above temperature settings is fed to a die for extrusion. It is also desirable that the extrusion conditions (set temperatures, screw shape and size, screw speed, etc.) be adjusted so as to attain an EVOH temperature (resin temperature) of 150 to 300° C. (more preferably 180 to 280° C.) within the die. When such temperature is lower than 150° C., the extrusion may sometimes become unstable. Conversely, at above 300° C., the EVOH quality may unfavorably be sacrificed (thermal deterioration).

The screw speed is selected within the range of 50 to 300 rpm (preferably 80 to 200 rpm). When such speed is less than 50 rpm, the drying capacity may become insufficient. Conversely, at above 300 rpm, the EVOH quality may unfavorably be sacrificed (thermal deterioration). The rate of feeding of the hydrous EVOH mass is selected within the range of 10 to 400 kg/hr (preferably 20 to 300 kg/hr). When such feeding rate is less than 10 kg/hr, the process becomes unproductive. Conversely, at above 400 kg/hr, sufficient drying may become impossible to attain and this is unfavorable. The residence time of the EVOH in the extruder is selected within the range of 10 to 600 seconds (preferably 10 to 180 seconds). When such residence time is shorter than 10 seconds, sufficient drying is impossible to attain in some instances. Conversely, a residence time exceeding 600 seconds may unfavorably lead to a deterioration in quality of EVOH (thermal deterioration). The pressure on EVOH (resin pressure) is selected within the range of 5 to 300 kg/cm$^2$ (preferably 10 to 200 kg/cm$^2$). When such pressure is less than 5 kg/cm$^2$ or in excess of 300 kg/cm$^2$, the extrusion may unfavorably become unstable. For preventing thermal degradation of EVOH, it is also desirable that the hopper inside and vent hole surroundings be sealed with nitrogen.

In cases where an EVOH composition composed of two or more EVOH species is dried in accordance with the present invention, the composition and molecular weight, among others, of each EVOH species of the composition are not particularly restricted but, when the composition is composed of two EVOH species (A) and (B) it is desirable for improving the heat-stretch moldability of the EVOH composition that at least one of the conditions defined by the formulas (4) to (6) shown below be satisfied. When the relation of formula (4) is not satisfied, namely when the difference in saponification degree between the two EVOH species is less than 1 mole percent, the heat-stretch moldability improving effect may not be attained to a satisfactory extent. Such difference in saponification degree is preferably 1 to 15 mole percent, more preferably 2 to 10 mole percent.

When the relation of formula (5) is not satisfied, namely when the difference in ethylene content between the two EVOH species is less than 5 mole percent, the heat-stretch moldability improving effect may not be attained to a satisfactory extent. Such difference in ethylene content is preferably 5 to 25 mole percent, more preferably 8 to 20 mole percent.

Further, when the relation of formula (6) is not satisfied, namely when the melt flow rate ratio between the two EVOH species is less than 2, the heat-stretch moldability improving effect may not be attained to a satisfactory extent. Such melt flow rate ratio is preferably 3 to 20, more preferably 4 to 15.

$$|Sv(A)-Sv(B)| \geq 1 \quad (4)$$

$$|Et(A)-Et(B)| \geq 5 \quad (5)$$

$$2 \leq MFR(B)/MFR(A) \quad (6)$$

where Sv represents the degree of saponification (mole percent) of each EVOH species, Et the ethylene content (mole percent) of each EVOH species and MFR the melt flow rate (g/10 min) of each EVOH species in an absolutely dry state (water content $\leq 0.3$ wt. %) as measured at a temperature of 210° C. under a load of 2,160 g.

Among the above values, the MFR is measured, more specifically, using a commercial melt indexer (e.g. product of Toyo Seiki) under the following conditions: temperature 210° C., load 2,160 g. Namely, the MFR measurements are carried out according to JIS K 7210 "Flow testing methods for thermoplastic materials", Procedure A (manual cutting).

When the EVOH species (A) and (B) are selected so as to satisfy at least the relation (4) among the relations (4) to (6), the heat-stretch moldability improving effect of the present invention becomes particularly remarkable.

In the case of EVOH compositions composed of three or more EVOH species, it is desirable that at least two EVOH species satisfy at least one of the above relations.

In the case of EVOH compositions composed of two EVOH species (A) and (B), the mixing weight ratio between the EVOH species (A) and (B) in such step of melt kneading as mentioned above is not particularly restricted but the ratio (A)/(B) is preferably 99/1 to 1/99 (more preferably 95/5 to 5/95, still more preferably 90/10 to 10/90). When such mixing weight ratio is outside the above range, the effects (appearance, gas barrier properties and continuous moldability in heat-stretch molding) of the blending technique according to the present invention may not be produced to a satisfactory extent in certain instances, hence such ratio is undesirable. The water content of EVOH (B) is not particularly restricted but is preferably 5 to 60% by weight (more preferably 10 to 50% by weight, still more preferably 10 to 40% by weight), like in the case of EVOH (A). If such water content is less than 5% by weight, the effects (continuous moldability, discoloration prevention, production efficiency in heat-stretch molding) of the blending technique according to the present invention may not be obtained to a satisfactory extent. If, conversely, it is in excess of 60% by weight, partial separation of the resin and water may occur during melt kneading, unfavorably rendering the melt kneading process unstable.

For the effects of the blending technique according to the present invention to be fully produced, it is desirable that the difference in water content between EVOH (A) and EVOH (B) be not more than 40% by weight (preferably not more than 30% by weight, more preferably not more than 20% by weight). Since the water content of such an EVOH composition (blend) is reduced to less than 5% by weight according to the present invention, it is desirable that the mean water content, prior to melt kneading, of the EVOH composition (blend) composed of EVOH (A) and (B) be selected at a level not lower than 5% by weight (preferably 10 to 50% by weight, more preferably 10 to 40% by weight).

In cases where the above EVOH composition further comprises an EVOH species (C), the mixing weight ratio among (A) to (C) may be selected so that the weight ratio (A)/[(B)+(C)] may amount to 99/1 to 1/99 (preferably 95/5 to 5/95, more preferably 90/10 to 10/90). Further, it is desirable that the water content of EVOH (C) be 5 to 60% (preferably 10 to 50% by weight, more preferably 10 to 40% by weight) and that the difference in water content between EVOH (C) and EVOH (A) or (B) be not more than 40% by weight (preferably not more than 30% by weight, more preferably not more than 20% by weight)

In this manner, the desired EVOH species or composition having a water content of less than 5% by weight is obtained. When, for example, such a twin screw extruder as mentioned above is used, such water content can be attained by adjusting various conditions, in particular the resin temperature (extruder temperatures as set) and the discharge rate (screw speed, resin feeding rate). For alleviating such troubles as bubble formation in the step of melt molding (e.g. extrusion molding, injection molding) after melt kneading, it is desirable that such water content be reduced more preferably to 2% by weight or less, most preferably to 0.5% or less.

After conducting the melt kneading according to the present invention, known drying treatment (e.g. hot air drying, drying by dielectric heating, drying by microwave heating) may be carried out in combination for the purpose of adjusting the water content of the EVOH species or composition, if necessary.

In the practice of the present invention, such EVOH species or composition may contain, unless the objects of the invention are defeated, a lubricant such as a saturated fatty acid amide (e.g. stearamide), an unsaturated fatty acid amide (e.g. oleamide), a bis-fatty acid amide (e.g. ethylenebisstearamide), a fatty acid metal salt (e.g. calcium stearate) or a low molecular weight polyolefin (e.g. low molecular weight polyethylene or polypropylene with a molecular weight of about 500 to 10,000), an inorganic salt (e.g. hydrotalcite), a plasticizer (e.g. ethylene glycol, glycerol, hexanediol or like aliphatic polyhydric alcohol), an oxygen absorber (e.g. reduced iron powder, ascorbic acid), a heat stabilizer, a light stabilizer, an antioxidant, an ultraviolet absorber, a colorant, an antistatic agent, a surfactant, an antimicrobial agent, a deodorant (e.g. active carbon), an antiblocking agent (e.g. minute talc particles), a slipping agent (e.g. amorphous silica), a filler (e.g. inorganic filler), another resin (e.g. polyolefin, polyamide) and/or the like. These additives may also be added at the EVOH solution stage. (Melt molding, laminate, stretching)

In the above manner, high quality EVOH species or EVOH compositions (blends) excellent in appearance, gas barrier properties, continuous moldability and discoloration suppression in heat-stretch molding can be obtained by the method of the present invention. Further, by the method of the present invention, it is possible to obtain stable EVOH species or compositions continuously. The thus-obtained EVOH species or compositions can be used in various fields of application not only as single layers but also as laminates. In particular, they are preferably used as laminates produced by providing at least one surface of a layer comprising any of such resins or resin compositions with a thermoplastic resin layer. Thus, laminates provided with water resistance, favorable mechanical properties, heat sealability and so forth and suited for practical use are obtained.

The laminates, in which the EVOH species or composition of the present invention is used, show very good effects in heat-stretch molding with respect to appearance, gas barrier properties and continuous moldability. In the following, such a laminate is described.

In producing the laminate, a layer of another material (e.g. thermoplastic resin) is laid on one or both sides of a layer of the EVOH species or composition prepared in accordance with the present invention. As the method of lamination, there may be mentioned, for example, the method comprising laminating a film, sheet or the like made of the EVOH species or composition according to the present invention with another material by melt extrusion, the method conversely comprising laminating another substrate with the EVOH of the invention by melt extrusion, the method comprising coextruding the EVOH of the invention and another material, and the method comprising dry laminating a layer made of the EVOH of the invention with another substrate layer using a known adhesive, such as an organotitanium compound, isocyanate compound, polyester compound or polyurethane compound. The melt molding temperature in the above melt extrusion is selected within the range of 150 to 300° C. in many instances.

Useful as such another material are thermoplastic resins, specifically including polyolefin resins in a broad sense, for example olefin homopolymers and copolymers, such as linear low density polyethylene, low density polyethylene, ultralow density polyethylene, medium density polyethylene, high density polyethylene, ethylene-vinyl acetate copolymers, ionomers, ethylene-propylene (block and random) copolymers, ethylene-acrylic acid copolymers, ethylene-acrylic ester copolymers, polypropylene, propylene-α-olelfin ($C_{4-20}$ α-olelfin) copolymers, polybutene and polypentene, or modifications of these olefin homopolymers and copolymers as derived by grafting with an unsaturated carboxylic acid or an ester thereof, as well as polyester resins, polyamide resins (inclusive of copolyamides), polyvinyl chloride, polyvinylidene chloride, acrylic resins, polystyrene, vinyl ester resins, polyester elastomers, polyurethane elastomers, chlorinated polyethylene, chlorinated polypropylene, aromatic or aliphatic polyketones, polyalcohols derived from these by reduction and, further, other EVOH species. From the practical viewpoint, for example considering physical properties (in particular strength) of laminates, polypropylene, ethylene-propylene (block and random) copolymers, polyamides, polyethylene, ethylene-vinyl acetate copolymers, polystyrene, polyethylene terephthalate (PET) and polyethylene naphthalate (PEN) are preferred, however.

Further, in the case of extrusion coating of another substrate with a film, sheet or the like molding made of the EVOH of the invention or laminating such molding with a film, sheet or the like made of another material using an adhesive, not only the above-mentioned thermoplastic materials but also any appropriate substrates (e.g. paper, metal foils, uniaxially or biaxially oriented plastics films or sheets and modification thereof derived by vapor deposition of an inorganic substance, woven fabrics, nonwoven fabrics, metal wool, wooden materials) can be used as such substrate.

When the layer made of the EVOH of the invention is represented by a ($a_1$, $a_2$, . . . ) and the another substrate, for example a thermoplastic resin layer by b ($b_1$, $b_2$, . . . ), the layer constitution of laminates includes, when the laminates are films, sheets or bottles, not only the bilayer constitution a/b but also such arbitrary combinations as b/a/b, a/b/a, $a_1/a_2/b$, $a/b_1/b_2$, $b_2/b_1/a/b_1/b_2$, $b_2/b_1/a/b_1/a/b_1/b_2$ and so forth and, further, when a regrind layer made of a mixture comprising at least an EVOH composition and a thermoplastic resin is represented by R, the constitutions b/R/a, b/R/a/b, b/R/a/R/b, b/a/R/a/b, b/R/a/R/a/R/b and so forth are also possible. In the case of filaments or the like, such arbitrary combinations as the a/b bimetal type, core (a)-sheath (b) type, core (b)-sheath (a) type and eccentric core-sheath type are possible.

In the layer constitutions mentioned above, an adhesive resin layer may be provided between respective neighboring layers, if necessary. As such adhesive resin, various species can be used, and they are preferred since laminates having good stretchability can be obtained by using them. The adhesive resins to be used may vary according to the type or species of the resin b, hence no general mention may be made. Nevertheless, there may be mentioned carboxyl-containing modified olefin polymers obtained by chemically binding an unsaturated carboxylic acid or an anhydride thereof to olefin polymers (the above-mentioned polyolefin resins in a broad sense) by the addition reaction or graft reaction, for instance. Specifically, one or a mixture of two or more selected from among maleic anhydride-grafted modified polyethylene, maleic anhydride-grafted modified polypropylene, maleic anhydride-grafted modified ethylene-propylene (block and random) copolymers, maleic anhydride-grafted modified ethylene-ethyl acrylate copolymers and maleic anhydride-grafted modified ethylene-vinyl acetate copolymers may be mentioned as a preferred one. In the above case, the content of the unsaturated carboxylic acid or anhydride thereof in the thermoplastic resin is preferably 0.001 to 3% by weight, more preferably 0.01 to 1% by weight, most preferably 0.03 to 0.5% by weight.

When the modifier content in the above modified resins is too low, the adhesiveness may become unsatisfactory. Conversely, an excessive modification is undesirable, since the moldability may be sacrificed due to crosslinking. It is also possible to blend the resin of the present invention or another EVOH species, polyisobutylene, ethylene-propylene rubber or like rubber or elastomer component or, further, the resin of layer b or the like with the above adhesive resins. In particular, it is useful to blend a polyolefin resin-based adhesive resin with a different polyolefin resin, since the adhesiveness may be improved thereby.

As for the appropriate thickness of each layer in the laminate, no general mention may be made since it depends on the layer constitution, species of b, use or container shape, required physical characteristics and so forth. Generally, however, the thickness of layer a is selected within the range of about 5 to 500 $\mu$m (preferably 10 to 200

μm), that of layer b within the range of about 10 to 5,000 μm (preferably 30 to 1,000 μm), and that of the adhesive resin layer within the range of about 5 to 400 μm (preferably 10 to 150 μm)

The above laminates may be used as they are in various shapes and sizes. Since, however, as mentioned above, the EVOH species or composition of the present invention is excellent in appearance, gas barrier properties and continuous moldability in heat-stretch molding, it is also desirable that the laminates be subjected to heat and stretch treatment for further improving the physical properties thereof. The heat and stretch treatment so referred to herein means the procedure for molding thermally uniformly heated laminates in the form of films, sheets or parisons uniformly into cups, trays, tubes, bottles, and films by means of chucks, plugs, vacuum force, compressed air force, blowing or the like. Such stretching may be uniaxial or biaxial and when it is carried out at a draw ratio as high as possible, stretched moldings better in physical properties and excellent in gas barrier properties can be obtained without pinhole or crack formation, uneven stretching or irregular section or delamination.

The stretching or drawing method can be selected from among the roll stretching, tenter stretching, tubular stretching, stretch blowing, vacuum/pressure molding and other techniques so that a high draw ratio can be attained. In the case of biaxial stretching, either the technique of simultaneous biaxial stretching or the technique of successive biaxial stretching may be employed. The stretching temperature is selected within the range of about 60 to 170° C., preferably about 80 to 160° C.

It is also desirable that thermal fixation be effected after completion of the stretching. The thermal fixation can be carried out by a well known method and the above stretched films and the like are subjected to heat treatment at 80 to 170° C., preferably 100 to 160° C., for about 2 to 600 seconds while maintaining them in a taut condition.

For use in heat shrinking packaging of raw meat, processed meat, cheese or the like, the films are not subjected to thermal fixation after stretching but are used as they are as product films and, after wrapping the raw meat, processed meat, cheese or the like therein, they are subjected to heat treatment at about 50 to 130° C., preferably 70 to 120° C., for about 2 to 300 seconds to thereby cause heat shrinkage of the films for attaining intimate contact wrapping.

The thus-obtained laminates may have any arbitrary shape and size. As examples, there may be mentioned films, sheets, tapes, bottles, pipes, filaments and extruded profiles. If necessary, the laminates obtained may be subjected to heat treatment, cooling treatment, rolling treatment, printing treatment, dry laminating treatment, solution or melt coating treatment, bag making process, deep draw process, box making process, tube making process and/or splitting process, for instance.

The cups, trays, tubes, bottles and like containers or stretched film-made bags or covers or covering devices are useful as packaging materials for foodstuffs, drinks, drugs, cosmetics, industrial chemicals, detergents, agrochemicals, fuels and various other materials.

EFFECTS OF THE INVENTION

According to the invention, EVOH is subjected to drying treatment by melt kneading and therefore the discoloration (yellowing) of EVOH can be prevented and the efficiency of EVOH production (drying) is good.

When an EVOH composition is prepared by blending different EVOH species, a high quality EVOH composition (EVOH blend) can be obtained while suppressing discoloration. Furthermore, according to the present invention, stable EVOH compositions can be obtained continuously with high efficiency.

The EVOH species or composition obtained is useful also in the field of multilayer structures, giving multilayer structures excellent in appearance, gas barrier properties and continuous moldability in heat and stretch molding, which are useful as packaging materials (e.g. films, sheets, containers) for foodstuffs, drinks, drugs, cosmetics, industrial chemicals, detergents, agrochemicals, fuels and so forth and as fibers and various moldings.

EXAMPLES

The following examples illustrate the present invention more specifically.

In the examples, "part(s)" and "%" are on the weight basis, unless otherwise specified.

The boric acid content in EVOH was determined by assaying boron by ICP emission spectrochemical analysis following alkali fusion of the EVOH. The alkali or alkaline earth metal content was determined by assaying the alkali or alkaline earth metal by atomic absorption spectrometry following ashing of EVOH and dissolution in aqueous hydrochloric acid.

Examples 1 to 12 and Comparative Example 1

Example 1

A methanol solution (1) containing 40% of an ethylene-vinyl acetate (EVA) copolymer (A) with an ethylene content of 32 mole percent and a methanol solution (2) containing 40% of an ethylene-vinyl acetate copolymer (B) with an ethylene content of 47 mole percent were prepared. To 85 parts of the above EVA solution (1) was added 15 parts of the EVA solution (2), and the mixture was mixed up with stirring at 40° C.

Then, the mixed solution was fed to the upper part of a plate column (saponification column) at a rate of 25 kg/hr and, at the same time, a methanol solution containing sodium hydroxide in an amount of 0.012 equivalent relative to the average number of moles of the residual acetate group in the above EVAs was fed to the column from the upper part thereof. On the other hand, methanol vapor at a boiling point was fed from the column bottom at a rate of 40 kg/hr. The column inside temperature was 110° C. and the column inside pressure was 3.5 kg/cm² G. At 30 minutes after the start of charging, an EVOH composition solution was discharged from the column bottom. The EVOH composition solution obtained was a transparent homogeneous solution and was composed of 29% of an EVOH composition and 71% of methanol and the average degree of saponification of the vinyl acetate component in the EVOH composition was 99.1 mole percent.

Then, after completion of the saponification reaction, the excess of methanol was distilled off while feeding 70 parts of 30% water-methanol at its azeotropic point, to give a solution of the EVOH composition in a water/methanol mixture [water/methanol=30/70 (by weight), resin concentration 32%].

The EVOH composition solution (liquid temperature 50° C.) was then extruded, in the strand form, into a coagulation medium (composed of 95% water and 5% methanol) maintained at 5° C. through a nozzle with a bore diameter of 4 mm to thereby cause coagulation of the EVOH composition in strand form. The strand-shaped EVOH composition was led to take-up rolls provided at the end of the water bath and then cut with a cutter to give white porous pellets with a diameter of 4 mm and a length of 4 mm.

The white porous pellets obtained were then poured into warm water at 30° C. and the mixture was stirred for about 60 minutes. This washing procedure was repeated three times in all to give hydrous EVOH composition pellets (water content 60%), which were then contacted with nitrogen gas in an atmosphere at 80° C. for 40 minutes using a column type fluidized bed drier (empty column velocity 1.6 m/sec), to give EVOH composition pellets with a water content of 25%.

The thus-obtained EVOH composition pellets were then fed to a twin screw extruder equipped with a strand die and melt kneading was carried out under the conditions shown below. The resulting strand was passed through a water tank and thus cooled and then cut with a pelletizer, to give EVOH composition pellets with a water content of 0.15%, an MFR of 4.8 g/10 min (210° C., load 2,160 g) and a sodium acetate content of 100 ppm (calculated as Na). The degree of saponification of the saponification product (EVOH) from EVA (A) in said composition was 99.5 mole percent and the MFR of said saponification product was 3.5 g/10 min (210° C., load 2,160 g), and the degree of saponification of the saponification product (EVOH) from EVA (B) was 96.8 mole percent and the MFR of said saponification product was 30 g/10 min (210° C., load 2,160 g). Such saponification degree of each EVOH component was determined by grinding said composition pellets, subjecting the same to an extraction procedure using hot methanol and measuring the degree of saponification of each EVOH component thus separated.

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

[Melt Pelletization Conditions Using a Twin Screw Extruder]

| | |
|---|---|
| Screw outside diameter | 57 mm ø |
| L/D | 44 |
| Strand die shape | 12 bores with a diameter of 3.5 mm ø |
| Screen mesh | 90/120/90 mesh |
| Vent | opened at sites C5 and C8; suction under vacuum at site C11 |
| Hooper inside | sealed with nitrogen |
| Screw speed | 100 rpm |
| Cylinder temperatures asset (actually measured values in the parentheses) | C1: 100° C. (100° C.) |
| | C2: 100° C. (100° C.) |
| | C3: 100° C. (100° C.) |
| | C4: 150° C. (146° C.) |
| | C5: 200° C. (196° C.) |
| | C6: 200° C. (178° C.) |
| | C7: 200° C. (191° C.) |
| | C8: 200° C. (185° C.) |
| | C9: 200° C. (198° C.) |
| | C10: 200° C. (198° C.) |
| | C11: 200° C. (196° C.) |
| | C12: 200° C. (202° C.) |
| | C13: 200° C. (203° C.) |
| | AD: 200° C. (200° C.) |
| | D: 200° C. (199° C.) |
| Screw load | 105 Amp |
| Resin pressure | 12 kg/cm$^2$ |

As shown above, the extruder cylinder temperature ($T_I$) at the hopper opening site C1 was 100° C. and the extruder cylinder temperature ($T_O$) at the outlet site C13 was 203° C., hence the ratio $T_O/T_I$ was 2.03 and thus satisfied the condition of formula (1) mentioned hereinabove. The temperature ($T_F$) (mean of C1 to C4) of the feeding zone of the extruder was 111.5° C. and the metering zone temperature ($T_M$) (mean of C10 to C13) was 199.75° C., hence the ratio $T_M/T_F$ was 199.75/111.5=1.79 and thus satisfied the condition of formula (2) mentioned hereinabove.

Using the EVOH composition obtained in the above manner, a multilayer structure was produced in the following manner (heat and stretch molding) and the structure was evaluated with respect to its appearance, gas barrier properties and continuous moldability.

[Manufacture of a Multilayer Structure]

The EVOH composition obtained in the above manner was fed, together with polystyrene ("Diarex HT51611", product of A & M Styrene) and an adhesive resin ("Modic AP F502", modified olefin polymer; product of Mitsubishi Chemical), to amultilayer extruder equipped with a three-feed-block five-layer T die to give a multilayer sheet consisting of polystyrene layer/adhesive resin layer/EVOH composition layer/adhesive resin layer/polystyrene layer (450/90/120/90/450 µm in thickness). The sheet was then subjected to heat-stretch molding using a plug-assist vacuum forming machine (product of Asano Kenkyusho) (heater temperature 500° C., heating time 28 sec) to give multilayer structures, namely cups (top surface 65 mm ø, bottom 60 mm ø, depth 55 mm).

Such multilayer structures were evaluated with respect to the appearance, gas barrier properties and continuous moldability, as follows.

(Appearance)

The cups obtained above were observed under an optical microscope. The following evaluation criteria were used.

○ - - - No microscopic cracks, pinholes or local irregular sections were observed at all.

Δ - - - Some microscopic cracks, pinholes and/or local irregular sections were observed on the cup sidewall.

X - - - A remarkable number of microscopic cracks, pinholes and/or local irregular sections were observed on the cup sidewall.

(Gas Barrier Properties)

The cups obtained above were each closely covered with an aluminum plate on the top and subjected to oxygen permeability testing (apparatus: Modern Control's OXTRAN 10/50; conditions: 23° C., 50% RH).

(Continuous Moldability)

The above heat-stretch molding procedure was carried out continuously for 2 hours and the thus-obtained 120 cups were evaluated according to the following criteria:

◎ - - - All the 120 cups were evaluated as ○ in the above appearance test.

○ - - - 117 to 119 cups were evaluated as ○ in the above appearance test.

Δ - - - 111 to 116 cups were evaluated as ○ in the above appearance test.

X - - - Not more than 110 cups were evaluated as ○ in the above appearance test.

Example 2

An EVOH composition with a water content of 0.25% was obtained in the same manner as in Example 1 except that the water content of the EVOH composition pellets was adjusted to 50% by modifying the drying conditions in the column type fluidized bed drier.

Upon observation by the eye, the EVOH composition obtained was found colorless and transparent, without any sign of yellowing. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 3

An EVOH composition with a water content of 0.25% was obtained in the same manner as in Example 1 except that the water content of the EVOH composition pellets was adjusted to 10% by modifying the drying conditions in the column type fluidized bed drier.

Upon observation by the eye, the EVOH composition obtained was found colorless and transparent, without any sign of yellowing. Such composition could be obtained efficiently at a rate of 70 kg/hr. Further, said pelletizing procedure was conducted continuously for 10 hours; pellets were obtained stably without strand breakage; no foreign substance or mucous substance was found at all.

Example 4

A methanol solution (1) containing 40% of an ethylene-vinyl acetate copolymer (EVA) (A) with an ethylene content of 34 mole percent and a methanol solution (2) containing 40% of an ethylene-vinyl acetate copolymer (B) with an ethylene content of 44 mole percent were prepared. To 80 parts of the above EVA solution (1) was added 20 parts of the EVA solution (2), and the mixture was mixed up with stirring at 40° C.

Then, the mixed solution was fed to the upper part of a plate column (saponification column) at a rate of 25 kg/hr and, at the same time, a methanol solution containing sodium hydroxide in an amount of 0.012 equivalent relative to the average number of moles of the residual acetate group in the above EVAs was fed to the column from the upper part thereof. On the other hand, methanol vapor at a boiling point was fed from the column bottom at a rate of 40 kg/hr. The column inside temperature was 110° C. and the column inside pressure was 3.5 kg/cm² G. At 30 minutes after the start of charging, an EVOH composition solution was discharged from the column bottom. The EVOH composition solution obtained was a transparent homogeneous solution and was composed of 30% of an EVOH composition and 70% of methanol and the average degree of saponification of the vinyl acetate component in the EVOH composition was 98.9 mole percent.

Then, after completion of the saponification reaction, the excess of methanol was distilled off while feeding 70 parts of 35% water-methanol at its azeotropic point, to give a solution of the EVOH composition in a water/methanol mixture [water/methanol=35/65 (by weight), resin concentration 35%].

The EVOH composition solution (liquid temperature 50° C.) was then extruded, in the strand form, into a coagulation medium (composed of 95% water and 5% methanol) maintained at 50° C. through a nozzle with a bore diameter of 4 mm to thereby cause coagulation of the EVOH composition in strand form. The strand-shaped EVOH composition was led to take-up rolls provided at the end of the water bath and then cut with a cutter to give white porous pellets with a diameter of 4 mm and a length of 4 mm.

The white porous pellets obtained were then poured into warm water at 30° C. and the mixture was stirred for about 60 minutes. This washing procedure was repeated three times in all to give hydrous EVOH composition pellets (water content 60%), which were then contacted with nitrogen gas in an atmosphere at 80° C. for 40 minutes using a column type fluidized bed column drier (empty column velocity 1.6 m/sec), to give EVOH composition pellets with a water content of 25%.

The thus-obtained EVOH composition pellets were then melt kneaded in the same manner as in Example 1 to give EVOH composition pellets with a water content of 0.15%, an MFR of 4.1 g/10 min (210° C., load 2,160 g) and a sodium acetate content of 100 ppm (calculated as Na). The degree of saponification of the saponification product from EVA (A) in said composition was 99.6 mole percent and the MFR of said saponification product was 3.0 g/10 min (210° C., load 2,160 g), and the degree of saponification of the saponification product from EVA (B) was 96.1 mole percent and the MFR of said saponification product was 15 g/10 min (210° C., load 2,160 g). Such saponification degree of each EVOH component was determined by grinding said composition pellets, subjecting the same to an extraction procedure using hot methanol and measuring the degree of saponification of each EVOH component thus separated.

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 5

A methanol solution (1) containing 40% of an ethylene-vinyl acetate copolymer (EVA) (A) with an ethylene content of 32 mole percent, a methanol solution (2) containing 40% of an ethylene-vinyl acetate copolymer (B) with an ethylene content of 40 mole percent and a methanol solution (3) containing 40% of an ethylene-vinyl acetate copolymer (C) with an ethylene content of 49 mole percent were prepared. To 65 parts of the above EVA solution (1) were added 20 parts of the EVA solution (2) and 15 parts of the EVA solution (3), and the mixture was mixed up with stirring at 40° C.

Then, the mixed solution was fed to the upper part of a plate column (saponification column) at a rate of 20 kg/hr and, at the same time, a methanol solution containing sodium hydroxide in an amount of 0.012 equivalent relative to the average number of moles of the residual acetate group in the above EVAs was fed to the column from the upper part thereof. On the other hand, methanol vapor at a boiling point was fed from the column bottom at a rate of 32 kg/hr. The column inside temperature was 110° C. and the column inside pressure was 3.5 kg/cm² G. At 40 minutes after the start of charging, an EVOH composition solution was discharged from the column bottom. The EVOH composition solution obtained was a transparent homogeneous solution and was composed of 26% of an EVOH composition and 74% of methanol and the average degree of saponification of the vinyl acetate component in the EVOH composition was 99.1 mole percent.

Then, after completion of the saponification reaction, the excess of methanol was distilled off while feeding 75 parts of 30% water-methanol at its azeotropic point, to give a solution of the EVOH composition in a water/methanol mixture [water/methanol=30/70 (by weight), resin concentration 30%].

The EVOH composition solution (liquid temperature 50° C.) was then extruded, in the strand form, into a coagulation medium (composed of 95% water and 5% methanol) maintained at 50° C. through a nozzle with a bore diameter of 4 mm to thereby cause coagulation of the EVOH composition in strand form. The strand-shaped EVOH composition was led to take-up rolls provided at the end of the water bath and then cut with a cutter to give white porous pellets with a diameter of 4 mm and a length of 4 mm.

The white porous pellets obtained were then poured into warm water at 30° C. and the mixture was stirred for about 60 minutes. This washing procedure was repeated three times in all to give hydrous EVOH composition pellets (water content 60%), which were then contacted with nitrogen gas in an atmosphere at 75° C. for 35 minutes using a column type fluidized bed column drier (empty column velocity 1.6 m/sec), to give EVOH composition pellets with a water content of 30%.

The thus-obtained EVOH composition pellets were then melt kneaded in the same manner as in Example 1 to give EVOH composition pellets with a water content of 0.15%, an MFR of 5.0 g/10 min (210° C., load 2,160 g) and a sodium acetate content of 100 ppm (calculated as Na). The degree of saponification of the saponification product from EVA (A) in said composition was 99.5 mole percent and the MFR of said saponification product was 3.5 g/10 min (210° C., load 2,160 g), the degree of saponification of the saponification product from EVA (B) was 99.5 mole percent and the MFR of said saponification product was 4.0 g/10 min (210° C., load 2,160 g), and the degree of saponification of EVA (C) was 97.0 mole percent and the MFR of the saponification product was 30 g/10 min (210° C., load 2,160 g). Such saponification degree of each EVOH component was determined by grinding said composition pellets, subjecting the same to a extraction procedure using hot methanol and measuring the degree of saponification of each EVOH component thus separated.

Upon observation by the eye, the EVOH composition obtained was found colorless and transparent and no yellowing was observed at all. Such composition could be obtained efficiently at a rate of 55 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 6

An EVOH composition (pellets) with a water content of 0.22% was obtained in the same manner as in Example 1 except that the extrusion temperatures among the melt kneading conditions in the twin screw extruder were modified as follows:

Cylinder Temperatures as Set (Actually Measured Values in the Parentheses)
C1: 50° C. (50° C.)
C2: 100° C. (100° C.)
C3: 150° C. (145° C.)
C4: 200° C. (198° C.)
C5: 230° C. (228° C.)
C6: 230° C. (227° C.)
C7: 230° C. (227° C.)
C8: 230° C. (224° C.)
C9: 230° C. (229° C.)
C10: 230° C. (230° C.)
C11: 230° C. (230° C.)
C12: 230° C.(231° C.)
C13: 230° C. (231° C.)
AD: 230° C. (230° C.)
D: 230° C. (229° C.)

As shown above, the extruder cylinder temperature ($T_I$) at the hopper opening site C1 was 50° C. and the extruder cylinder temperature ($T_O$) at the outlet site C13 was 231° C., hence the ratio $T_O/T_I$ was 4.62 and thus satisfied the condition of formula (1) mentioned hereinabove. The temperature ($T_F$) (mean of C1 to C4) of the feeding zone of the extruder was 123.25° C. and the metering zone temperature ($T_M$) (mean of C10 to C13) was 230.5° C., hence the ratio $T_M/T_F$ was 230.5/123.25=1.87 and thus satisfied the condition of formula (2) mentioned hereinabove.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 7

An EVOH composition (pellets) with a water content of 0.20% was obtained in the same manner as in Example 1 except that the extrusion temperatures among the melt kneading conditions in the twin screw extruder were modified as follows:

Cylinder Temperatures as Set (Actually Measured Values in the Parentheses)
C1: 30° C. (31° C.)
C2: 50° C. (50° C.)
C3: 50° C. (62° C.)
C4: 100° C. (97° C.)
C5: 250° C. (241° C.)
C6: 250° C. (241° C.)
C7: 250° C. (249° C.)
C8: 250° C. (248° C.)
C9: 250° C. (250° C.)
C10: 250° C. (250° C.)
C11: 250° C. (251° C.)
C12: 250° C. (251° C.)
C13: 250° C. (252° C.)
AD: 250° C. (250° C.)
D: 250° C. (250° C.)

As shown above, the extruder cylinder temperature ($T_I$) at the hopper opening site C1 was 31° C. and the extruder cylinder temperature ($T_O$) at the outlet site C13 was 252° C., hence the ratio $T_O/T_I$ was 252/31=8.13 and thus satisfied the condition of formula (1) mentioned hereinabove. The temperature ($T_F$) (mean of C1 to C4) of the feeding zone of the extruder was 60° C. and the metering zone temperature ($T_M$) (mean of C10 to C13) was 251° C., hence the ratio $T_M/T_F$ was 251/60=4.18 and thus satisfied the condition of formula (2) mentioned hereinabove.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 8

An EVOH composition (pellets) with a water content of 0.20% was obtained in the same manner as in Example 1 except that the melt kneading conditions in the twin screw extruder were modified as follows:

| | |
|---|---|
| Screw outside diameter | 83 mm ø |
| L/D | 30 |
| Strand die shape | 20 bores with a diameter of 4.5 mm ø |
| Screen mesh | 90/120/90 mesh |
| Vent | opened at site C3; suction under vacuum at site C5 |
| Hooper inside | sealed with nitrogen |
| Screw speed | 200 rpm |
| Cylinder temperatures as set (actually measured values in the parentheses) | C1: 100° C. (99° C.) |
| | C2: 100° C. (99° C.) |
| | C3: 100° C. (100° C.) |
| | C4: 150° C. (163° C.) |
| | C5: 200° C. (219° C.) |
| | C6: 200° C. (222° C.) |
| | AD: 200° C. (220° C.) |
| | D: 200° C. (229° C.) |
| Screw load | 140 Amp |
| Resin pressure | 100 kg/cm² |

As shown above, the extruder cylinder temperature ($T_I$) at the hopper opening site C1 was 99° C. and the extruder cylinder temperature ($T_O$) at the outlet site C6 was 222° C., hence the ratio $T_O/T_I$ was 2.24 and thus satisfied the condition of formula (1) mentioned hereinabove. The temperature ($T_F$) (mean of C1 and C2) of the feeding zone of the extruder was 99° C. and the metering zone temperature ($T_M$) (mean of C5 and C6) was 220.5° C., hence the ratio $T_M/T_F$ was 220.5/99=2.23 and thus satisfied the condition of formula (2) mentioned hereinabove.

Upon observation by the eye, the EVOH composition obtained was found colorless and transparent and no yellowing was observed at all. Such composition could be obtained efficiently at a rate of 150 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 9

An EVOH composition (pellets) with a water content of 0.25% was obtained in the same manner as in Example 1 except that the melt kneading conditions in the twin screw extruder were modified as follows:

| | |
|---|---|
| Screw outside diameter | 30 mm ø |
| L/D | 42 |
| Strand die shape | 2 bores with a diameter of 3.5 mm ø |
| Screen mesh | 90/90 mesh |
| Vent | opened at site C4; suction under vacuum at site C6 |
| Hooper inside | sealed with nitrogen |
| Screw speed | 120 rpm |
| Cylinder temperatures as set (actually measured values in the parentheses) | C1: 100° C. (100° C.) |
| | C2: 100° C. (100° C.) |
| | C3: 100° C. (100° C.) |
| | C4: 150° C. (143° C.) |
| | C5: 200° C. (198° C.) |
| | C6: 200° C. (196° C.) |
| | C7: 200° C. (200° C.) |
| | AD: 200° C. (200° C.) |
| D: 200° C. (200° C.) | |
| Screw load | 20 Amp |
| Resin pressure | 75 kg/cm² |

As shown above, the extruder cylinder temperature ($T_I$) at the hopper opening site C1 was 100° C. and the extruder cylinder temperature ($T_O$) at the outlet site C7 was 200° C., hence the ratio $T_O/T_I$ was 2 and thus satisfied the condition of formula (1) mentioned hereinabove. The temperature ($T_F$) (mean of C1 and C2) of the feeding zone of the extruder was 100° C. and the metering zone temperature ($T_F$) (mean of C6 and C7) was 198° C., hence the ratio $T_M/T_F$ was 198/100= 1.98 and thus satisfied the condition of formula (2) mentioned hereinabove.

Upon observation by the eye, the EVOH composition obtained was found colorless and transparent and no yellowing was observed at all. Such composition could be obtained efficiently at a rate of 10 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 10

An EVOH composition (pellets) with a water content of 0.28% was obtained in the same manner as in Example 1 except that a single screw extruder was used and the melt kneading conditions were modified as follows:

| | |
|---|---|
| Screw outside diameter | 75 mm ø |
| L/D | 36 |
| Strand die shape | 24 bores with a diameter of 4.5 mm ø |
| Screen mesh | 90/90 mesh |
| Vent | opened at site C3; suction under vacuum at site C6 |
| Hooper inside | sealed with nitrogen |
| Screw speed | 200 rpm |

-continued

| | |
|---|---|
| Cylinder temperatures as set (actually measured values in the parentheses) | C1: 100° C. (97° C.)<br>C2: 100° C. (99° C.)<br>C3: 100° C. (99° C.)<br>C4: 150° C. (159° C.)<br>C5: 200° C. (218° C.)<br>C6: 300° C. (277° C.)<br>C7: 300° C. (277° C.)<br>AD: 200° C. (270° C.)<br>D: 200° C. (270° C.) |
| Screw load | 120 Amp |
| Resin pressure | 70 kg/cm² |

As shown above, the extruder cylinder temperature ($T_I$) at the hopper opening site C1 was 97° C. and the extruder cylinder temperature ($T_O$) at the outlet site C7 was 277° C., hence the ratio $T_O/T_I$ was 2.86 and thus satisfied the condition of formula (1) mentioned hereinabove. The temperature ($T_F$) (mean of C1 and C2) of the feeding zone of the extruder was 98° C. and the metering zone temperature ($T_M$) (mean of C6 and C7) was 277° C., hence the ratio $T_M/T_F$ was 277/98=2.83 and thus satisfied the condition of formula (2) mentioned hereinabove.

Upon observation by the eye, the EVOH composition obtained was found colorless and transparent and no yellowing was observed at all. Such composition could be obtained efficiently at a rate of 100 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 11

An EVOH composition (pellets) with a water content of 0.15% was obtained in the same manner as Example 1 except that the EVOH composition in white porous pellet form as obtained in Example 1 (coagulation precipitate) was washed with a 0.5% aqueous solution of acetic acid and then introduced into an aqueous solution containing 0.1% of acetic acid, 0.03% of magnesium acetate and 0.02% of calcium acetate, followed by stirring at 30° C. for 5 hours, to give hydrous EVOH composition pellets [the EVOH composition after drying containing 100 ppm of acetic acid, 35 ppm (as Mg) of magnesium acetate and 20 ppm (as Ca) of calcium acetate].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 12

An EVOH composition (pellets) with a water content of 0.15% was obtained in the same manner as Example 1 except that the EVOH composition in white porous pellet form as obtained in Example 1 (coagulation precipitate) was washed with warm water and then introduced into an aqueous solution containing 0.08% of boric acid, followed by stirring at 30° C. for 5 hours, to give hydrous EVOH composition pellets [the EVOH composition after drying containing 380 ppm (as boron) of boric acid].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Comparative Example 1

According to the procedure of Example 1, an ethylene-vinyl acetate copolymer (A) and an ethylene-vinyl acetate copolymer (B) were separately subjected to saponification (degree of saponification: (A) 99.5 mole percent, (B) 96.8 mole percent) and the dried pellets (water content: EVOH pellets (A) 0.30%, EVOH (B) 0.25%) were dry-blended in a predetermined ratio and fed to the twin screw extruder for melt kneading at 200° C., to give an EVOH composition (pellets) with a water content of 0.10%.

Upon observation, by the eye, of the EVOH composition (pellets) obtained, slight discoloration (yellowing) was found. The rate of production of the EVOH composition as calculated from the drying step, inclusive, was about 1 kg/hr and thus the efficiency was low.

Using the pellets, multilayer structures were produced and the appearance and gas barrier properties thereof and the continuous moldability were evaluated in the same manner as in Example 1.

The results of the appearance, gas barrier properties and continuous moldability evaluations as obtained in the above examples and comparative example are summarized in Table 1.

TABLE 1

| | Appearance | Gas barrier properties | Continuous moldability |
|---|---|---|---|
| Example 1 | ◯ | 0.31 | ⊚ |
| Example 2 | ◯ | 0.31 | ⊚ |
| Example 3 | ◯ | 0.31 | ⊚ |
| Example 4 | ◯ | 0.44 | ⊚ |
| Example 5 | ◯ | 0.34 | ⊚ |
| Example 6 | ◯ | 0.31 | ⊚ |
| Example 7 | ◯ | 0.31 | ⊚ |
| Example 8 | ◯ | 0.31 | ⊚ |
| Example 9 | ◯ | 0.31 | ⊚ |
| Example 10 | ◯ | 0.31 | ⊚ |
| Example 11 | ◯ | 0.30 | ⊚ |
| Example 12 | ◯ | 0.30 | ⊚ |
| Compar. Ex. 1 | ◯ | 0.33 | × |

Notes)
The gas barrier properties are represented by the oxygen permeability, cc/m² · day · atm.

Examples 13 to 23 and Comparative Example 2

In Examples 13 to 23, which are described below, the melt pelletization was carried out using a twin screw extruder under the conditions specified below in Table 2.

TABLE 2

| Conditions | Ex. 13 | Ex. 17 | Ex. 18 | Ex. 19 | Ex. 20 | Ex. 21 |
|---|---|---|---|---|---|---|
| Screw outside diameter (mm φ) | 57 | 57 | 57 | 83 | 30 | 75 |
| L/D | 44 | 44 | 44 | 30 | 42 | 36 |
| Strand die shape Diameter (mm φ)/number of bores | 3.5/12 | 3.5/12 | 3.5/12 | 4.5/20 | 3.5/2 | 4.5/24 |
| Screen mesh (mesh) | 90/120/90 | 90/120/90 | 90/120/90 | 90/120/90 | 90/90 | 90/90 |
| Vent | | | | | | |
| Opened at | C5, C8 | C5, C8 | C5, C8 | C3 | C4 | C3 |
| Suctioned under vacuum at | C11 | C11 | C11 | C5 | C6 | C6 |
| Hopper sealing | $N_2$ | $N_2$ | $N_2$ | $N_2$ | $N_2$ | $N_2$ |
| Screw speed (rpm) | 100 | 100 | 100 | 200 | 120 | 200 |
| Cylinder temperature as set (actually measured temperature) | | | | | | |
| C1 | 100° C. (100° C.) | 50° C. (50° C.) | 30° C. (32° C.) | 100° C. (100° C.) | 100° C. (100° C.) | 100° C. (97° C.) |
| C2 | 100° C. (100° C.) | 100° C. (100° C.) | 50° C. (50° C.) | 100° C. (100° C.) | 100° C. (100° C.) | 100° C. (99° C.) |
| C3 | 100° C. (100° C.) | 150° C. (145° C.) | 50° C. (64° C.) | 100° C. (100° C.) | 100° C. (100° C.) | 100° C. (99° C.) |
| C4 | 150° C. (146° C.) | 200° C. (198° C.) | 100° C. (97° C.) | 150° C. (163° C.) | 150° C. (143° C.) | 150° C. (158° C.) |
| C5 | 200° C. (198° C.) | 230° C. (228° C.) | 250° C. (241° C.) | 200° C. (221° C.) | 200° C. (198° C.) | 200° C. (218° C.) |
| C6 | 200° C. (178° C.) | 230° C. (227° C.) | 250° C. (241° C.) | 200° C. (222° C.) | 200° C. (194° C.) | 300° C. (277° C.) |
| C7 | 200° C. (191° C.) | 230° C. (227° C.) | 250° C. (249° C.) | | 200° C. (200° C.) | 300° C. (276° C.) |
| C8 | 200° C. (185° C.) | 230° C. (224° C.) | 250° C. (248° C.) | | | |
| C9 | 200° C. (198° C.) | 230° C. (229° C.) | 250° C. (250° C.) | | | |
| C10 | 200° C. (198° C.) | 230° C. (230° C.) | 250° C. (250° C.) | | | |
| C11 | 200° C. (196° C.) | 230° C. (230° C.) | 250° C. (251° C.) | | | |
| C12 | 200° C. (203° C.) | 230° C. (231° C.) | 250° C. (252° C.) | | | |
| C13 | 200° C. (204° C.) | 230° C. (232° C.) | 250° C. (252° C.) | | | |
| AD | 200° C. (200° C.) | 230° C. (230° C.) | 250° C. (250° C.) | 200° C. (220° C.) | 200° C. (200° C.) | 200° C. (270° C.) |
| D | 200° C. (199° C.) | 230° C. (229° C.) | 250° C. (250° C.) | 200° C. (220° C.) | 200° C. (200° C.) | 200° C. (270° C.) |
| $T_O/T_I$ (C13/C1) | 2.04 | 4.64 | 7.88 | | | |
| $T_M/T_F$ (C10–13/C1–4) | 1.80 | 1.87 | 4.14 | | | |
| $T_O/T_I$ (C6/C1) | | | | 2.22 | | |
| $T_M/T_F$ (C5–6/C1–2) | | | | 2.22 | | |
| $T_O/T_I$ (C7/C1) | | | | | 2.00 | 2.85 |
| $T_M/T_F$ (C–7/C1–2) | | | | | 1.97 | 2.82 |
| Screw load (Amp) | 105 | 105 | 105 | 140 | 20 | 120 |
| Resin pressure (kg/cm²) | 12 | 12 | 12 | 100 | 75 | 70 |

Example 13

Saponification was carried out at 110° C. over 2.5 hours by feeding 40 parts of a methanol solution containing 6% of sodium hydroxide and 2,500 parts of methanol continuously to 1,000 parts of a methanol solution containing 40% of an ethylene-vinyl acetate copolymer with an ethylene content of 32 mole percent while distilling off the byproduct methyl acetate and the excess methanol from the system, to give EVOH with a degree of saponification of the vinyl acetate moieties of 99.5 mole percent. After completion of the saponification reaction, the excess methanol was distilled off while feeding 450 parts of 50% water-methanol at an azeotropic point, to give an EVOH solution in a water-methanol mixture [water/methanol=50/50 (by weight), resin concentration 40%].

The EVOH solution (liquid temperature 50° C.) was then extruded, in the strand form, into a coagulation medium (composed of 95% of water and 5% of methanol) maintained at 50° C. through a nozzle having a bore size of 4 mm, to thereby cause the EVOH to coagulate in strand form. The strand-shaped EVOH was led to take-up rolls provided at the end of the water bath and then cut with a cutter to give white porous pellets with a diameter of 4 mm and a length of 4 mm.

Further, the white porous pellets obtained were introduced into 1,000 parts of warm water at 30° C. and the mixture was stirred for about 240 minutes to effect washing. The thus-obtained hydrous EVOH pellets (water content 60%) were then contacted with nitrogen gas in an atmosphere at 80° C. for 40 minutes in a column type fluidized bed drier (empty column speed 1.6 m/sec) to give EVOH pellets (A) with a water content of 25% and an MFR of 3.5 g/10 min (in absolutely dried state; 210° C., load 2,160 g).

Separately, EVOH pellets (B) with a water content of 30%, an ethylene content of 47 mole percent, a degree of saponification of 96.8 mole percent and an MFR of 30 g/10 min (in absolutely dried state; 210° C., load 2,160 g) were obtained in the same manner as mentioned above.

Then, 84 parts of the EVOH pellets (A) and 16 parts of the EVOH pellets (B) thus obtained were dry-blended and the mixture was fed to a twin screw extruder equipped with a strand die and melt kneading was effected under the conditions shown below. The strand formed was passed through a water tank and thus cooled and then cut with a pelletizer to give EVOH composition pellets with a water content of 0.15% and a sodium acetate content of 100 ppm (as Na).

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

The melt pelletizing conditions in the twin screw extruder were as shown above in Table 2.

Using the EVOH composition obtained in the above manners multilayer structures were produced in the same manner as in Example 1 (heat-stretch molding) and the appearance, gas barrier properties and continuous moldability were evaluated in the same manner as in Example 1.

Example 14

An EVOH composition (pellets) with a water content of 0.22% was obtained in the same manner as in Example 13 except that the water content of EVOH pellets (A) was adjusted to 40% and the water content of EVOH pellets (B) to 35% by modifying the drying conditions in the column type fluidized bed drier.

Example 15

An EVOH composition (pellets) with a water content of 0.15% and a sodium acetate content of 120 ppm (as Na) was obtained in the same manner as in Example 13 except that EVOH pellets (A) with a water content of 15%, an ethylene content of 34 mole percent, a saponification degree of 99.6 mole percent and an MFR of 3.0 g/10 min (in absolutely dried state; 210° C., load 2,160 g) and EVOH pellets (B) with a water content of 15%, an ethylene content of 44 mole percent, a saponification degree of 96.1 mole percent and an MFR of 15 g/10 min (in absolutely dried state; 210° C., load 2,160 g) were used at a mixing weight ratio of (A)/(B)=80/20.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 16

An EVOH composition (pellets) with a water content of 0.18% and a sodium acetate content of 135 ppm (as Na) was obtained in the same manner as in Example 13 except that EVOH pellets (A) with a water content of 25%, an ethylene content of 32 mole percent, a saponification degree of 99.5 mole percent and an MFR of 3.5 g/10 min (in absolutely dried state; 210° C., load 2,160 g), EVOH pellets (B) with a water content of 30%, an ethylene content of 49 mole percent, a saponification degree of 97.0 mole percent and an MFR of 30 g/10 min (in absolutely dried state; 210° C., load 2,160 g) and EVOH pellets (C) with a water content of 25%, an ethylene content of 40 mole percent, a saponification degree of 99.5 mole percent and an MFR of 4.0 g/10 min (in absolutely dried state; 210° C., load 2,160 g) were used at a mixing weight ratio of (A)/(B)/(C)=65/15/20.

Upon observation by the eye, the EVOH composition obtained was found colorless and transparent and no yellowing was observed at all. Such composition could be obtained efficiently at a rate of 60 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 17

An EVOH composition (pellets) with a water content of 0.22% was obtained in the same manner as in Example 13 except that, among the melt kneading conditions in the twin screw extruder, the extrusion temperature conditions were modified as shown in Table 2.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 18

An EVOH composition (pellets) with a water content of 0.20% was obtained in the same manner as in Example 13 except that, among the melt kneading conditions in the twin screw extruder, the extrusion temperature conditions were modified as shown in Table 2.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 19

An EVOH composition (pellets) with a water content of 0.20% was obtained in the same manner as in Example 13 except that, among the melt kneading conditions in the twin screw extruder, the extrusion temperature conditions were modified as shown in Table 2.

Upon observation by the eye, the EVOH composition obtained was found colorless and transparent and no yellowing was observed at all. Such composition could be obtained efficiently at a rate of 150 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 20

An EVOH composition (pellets) with a water content of 0.25% was obtained in the same manner as in Example 13 except that the melt kneading conditions in the twin screw extruder were modified as shown in Table 2.

Upon observation by the eye, the EVOH composition obtained was found colorless and transparent and no yellowing was observed at all. Such composition could be obtained efficiently at a rate of 10 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 21

An EVOH composition (pellets) with a water content of 0.28% was obtained in the same manner as in Example 13 except that a single screw extruder was used and that the melt kneading conditions were modified as shown in Table 2.

Upon observation by the eye, the EVOH composition obtained was found colorless and transparent and no yellowing was observed at all. Such composition could be obtained efficiently at a rate of 100 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 22

An EVOH composition (pellets) with a water content of 0.15% was obtained in the same manner as in Example 13 except that the white porous pellets (A) obtained were washed with a 0.5% aqueous solution of acetic acid and then introduced into an aqueous solution containing 0.1% of acetic acid, 0.03% of magnesium acetate and 0.02% of calcium acetate and the mixture was stirred at 30° C. for 5 hours to give hydrous EVOH pellets (A) [100 ppm of acetic acid, 35 ppm (as magnesium) of magnesium acetate and 20 ppm (as calcium) of calcium acetate being contained in the EVOH (A) after drying].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Example 23

An EVOH composition (pellets) with a water content of 0.15% was obtained in the same manner as in Example 13 except that the white porous pellets (B) obtained were washed with warm water and then introduced into an aqueous solution containing 0.08% of boric acid and the mixture was stirred at 30° C. for 5 hours to give hydrous EVOH pellets (B) [380 ppm (as boron) of boric acid being contained in the EVOH (B) after drying].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced and the appearance and gas barrier properties thereof and the continuous moldability were evaluated in the same manner as in Example 1.

Comparative Example 2

An EVOH composition (pellets) with a water content of 0.10% was obtained in the same manner as in Example 13 except that the water content of EVOH pellets (A) was adjusted to 0.30% and the water content of EVOH pellets (B) to 0.25% by modifying the drying conditions in the column type fluidized bed drier.

Upon observation, by the eye, of the EVOH composition (pellets) obtained, slight discoloration (yellowing) was found. The rate of production of the EVOH composition as calculated from the drying step, inclusive, was about 1 kg/hr and thus the efficiency was low.

Using the pellets, multilayer structures were produced and the appearance and gas barrier properties thereof and the continuous moldability were evaluated in the same manner as in Example 1.

The results of the appearance, gas barrier properties and continuous moldability evaluations as obtained in the above examples and comparative example are summarized in Table 3.

TABLE 3

|  | Appearance | Gas barrier properties | Continuous moldability |
|---|---|---|---|
| Example 13 | ○ | 0.31 | ◎ |
| Example 14 | ○ | 0.36 | ◎ |
| Example 15 | ○ | 0.44 | ◎ |
| Example 16 | ○ | 0.34 | ◎ |
| Example 17 | ○ | 0.31 | ◎ |
| Example 18 | ○ | 0.31 | ◎ |
| Example 19 | ○ | 0.31 | ◎ |
| Example 20 | ○ | 0.31 | ◎ |
| Example 21 | ○ | 0.32 | ○ |
| Example 22 | ○ | 0.31 | ◎ |
| Example 23 | ○ | 0.30 | ◎ |
| Compar. Ex. 2 | ○ | 0.33 | × |

Notes)
The gas barrier properties are represented by the oxygen permeability, $cc/m^2 \cdot day \cdot atm$.

Example 24 to 34 and Comparative Example 3

In Examples 24 to 34, which are described below, the melt pelletization was carried out using a twin screw extruder under the conditions specified below in Table 4.

TABLE 4

| Conditions | Ex. 24 | Ex. 28 | Ex. 29 | Ex. 30 | Ex. 31 | Ex. 32 |
|---|---|---|---|---|---|---|
| Screw outside diameter (mm φ) | 57 | 57 | 57 | 83 | 30 | 75 |
| L/D | 44 | 44 | 44 | 30 | 42 | 36 |
| Strand die shape Diameter (mm φ)/number of bores | 3.5/ 12 | 3.5/ 12 | 3.5/ 12 | 4.5/ 20 | 3.5/ 2 | 4.5/ 24 |
| Screen mesh (mesh) | 90/120/ 90 | 90/120/ 90 | 90/120/ 90 | 90/120/ 90 | 90/90 | 90/90 |
| Vent | | | | | | |
| Opened at | C5, C8 | C5, C8 | C5, C8 | C3 | C4 | C3 |
| Suctioned under vacuum at | C11 | C11 | C11 | C5 | C6 | C6 |
| Hopper sealing | $N_2$ | $N_2$ | $N_2$ | $N_2$ | $N_2$ | $N_2$ |
| Screw speed (rpm) | 100 | 100 | 100 | 200 | 120 | 200 |
| Cylinder temperature as set (actually measured temperature) | | | | | | |
| C1 | 100° C. (100° C.) | 50° C. (50° C.) | 30° C. (31° C.) | 100° C. (100° C.) | 100° C. (100° C.) | 100° C. (97° C.) |
| C2 | 100° C. (100° C.) | 100° C. (100° C.) | 50° C. (50° C.) | 100° C. (99° C.) | 100° C. (100° C.) | 100° C. (99° C.) |
| C3 | 100° C. (100° C.) | 150° C. (145° C.) | 50° C. (62° C.) | 100° C. (100° C.) | 100° C. (100° C.) | 100° C. (99° C.) |
| C4 | 150° C. (146° C.) | 200° C. (198° C.) | 100° C. (97° C.) | 150° C. (163° C.) | 150° C. (143° C.) | 150° C. (158° C.) |
| C5 | 200° C. (198° C.) | 230° C. (228° C.) | 250° C. (241° C.) | 200° C. (220° C.) | 200° C. (198° C.) | 200° C. (218° C.) |
| C6 | 200° C. (178° C.) | 230° C. (227° C.) | 250° C. (241° C.) | 200° C. (222° C.) | 200° C. (194° C.) | 300° C. (277° C.) |
| C7 | 200° C. (191° C.) | 230° C. (227° C.) | 250° C. (249° C.) | | 200° C. (200° C.) | 300° C. (277° C.) |
| C8 | 200° C. (185° C.) | 230° C. (224° C.) | 250° C. (248° C.) | | | |
| C9 | 200° C. (198° C.) | 230° C. (229° C.) | 250° C. (250° C.) | | | |
| C10 | 200° C. (198° C.) | 230° C. (230° C.) | 250° C. (250° C.) | | | |
| C11 | 200° C. (196° C.) | 230° C. (230° C.) | 250° C. (251° C.) | | | |
| C12 | 200° C. (202° C.) | 230° C. (231° C.) | 250° C. (252° C.) | | | |
| C13 | 200° C. (204° C.) | 230° C. (231° C.) | 250° C. (252° C.) | | | |
| AD | 200° C. (200° C.) | 230° C. (230° C.) | 250° C. (250° C.) | 200° C. (220° C.) | 200° C. (200° C.) | 200° C. (270° C.) |
| D | 200° C. (199° C.) | 230° C. (229° C.) | 250° C. (250° C.) | 200° C. (220° C.) | 200° C. (200° C.) | 200° C. (270° C.) |
| $T_O/T_I$ (C13/C1) | 2.04 | 4.62 | 8.13 | | | |
| $T_M/T_F$ (C10–13/C1–4) | 1.79 | 1.87 | 4.19 | | | |
| $T_O/T_I$ (C6/C1) | | | | 2.22 | | |
| $T_M/T_F$ (C5–6/C1–2) | | | | 2.22 | | |
| $T_O/T_I$ (C7/C1) | | | | | 2.00 | 2.86 |
| $T_M/T_F$ (C6–7/C1–2) | | | | | 1.97 | 2.83 |
| Screw load (Amp) | 105 | 105 | 105 | 140 | 20 | 120 |
| Resin pressure (kg/cm$^2$) | 12 | 12 | 12 | 100 | 75 | 70 |

Example 24

A solution (1) containing 40% of an EVOH species (A) with an ethylene content (X1) of 32 mole percent, a saponification degree of 99.5 mole percent and an MFR of 3.5 g/10 min (210° C., load 2,160 g) in a water-methanol mixture [water/methanol mixing weight ratio=50/50, water content (Y1)=50%] and a solution (2) containing 35% of an EVOH species (B) with an ethylene content (X2) of 47 mole percent, a saponification degree of 96.8 mole percent and an MFR of 30 g/10 min (210° C., load 2,160 g) in a water-methanol mixture [water/methanol mixing weight ratio =20/80, water content (Y2)=20%] were prepared. Thus, the water content (Y1) of the solvent in the mixed solution (1) was 50%, and substitution of the above ethylene content (X1=32 mole percent) into the formula (3) given hereinabove gave 56≧Y1≧36; hence, such water content (Y1) satisfied the conditions of formula (3). The water content (Y2) of the solvent in the mixed solution (2) was 20%, and substitution of the above ethylene content (X2=47 mole percent) into the formula (3) given hereinabove gave 27≧Y2≧7; hence, such water content (Y2) satisfied the conditions of formula (3).

To 83 parts of the above EVOH solution (1) was added gradually 17 parts of the EVOH solution (2) with stirring at 40° C., and the mixture was mixed up with stirring. Further, 3.5 parts of a 10% aqueous solution of sodium acetate was added and the mixture was stirred at 40° C. for 30 minutes, to give a water-methanol mixed solvent solution containing two EVOH species.

The mixed solution obtained was then extruded in the form of a strand into a coagulation bath comprising 5% of methanol and 95% of water and maintained at 5° C. through a nozzle (inside diameter 4 mm) to thereby cause precipitation (coagulation).

After completion of the coagulation, the strand-shaped matter was cut with a cutter, the thus-obtained white porous pellets were further introduced into 1,000 parts of warm water at 30° C. and the mixture was stirred for about 240 minutes to effect washing, to give hydrous EVOH pellets (water content 60%). These pellets were contacted with nitrogen gas in an atmosphere at 80° C. in a column type fluidized bed drier (empty column velocity 1.6 m/sec) for 40 minutes to give an EVOH composition (pellets) with a water content of 25% by weight.

Then, the EVOH composition pellets obtained were fed to a twin screw extruder equipped with a strand die and melt kneading was effected under the conditions mentioned below. The strand formed was passed through a water tank and thus cooled and then cut with a pelletizer to give EVOH composition pellets with a water content of 0.15% and a sodium acetate content of 100 ppm (as Na).

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

The melt pelletizing conditions in the twin screw extruder were as shown above in Table 4.

Using the EVOH composition obtained in the above manner, multilayer structures were produced in the same manner as in Example 1 (heat-stretch molding) and the appearance, gas barrier properties and continuous moldability were evaluated in the same manner as in Example 1.

Example 25

An EVOH composition with a water content of 0.25% was obtained in the same manner as in Example 24 except that the water content of EVOH composition pellets was adjusted to 50% by modifying the drying conditions in the column type fluidized bed drier.

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 26

A solution (1) containing 38% of an EVOH species (A) with an ethylene content (X1) of 34 mole percent, a saponification degree of 99.6 mole percent and an MFR of 3.0 g/10 min (210° C., load 2,160 g) in a water-methanol mixture [water/methanol mixing weight ratio=35/65, water content (Y1)=35%] and a solution (2) containing 35% of an EVOH species (B) with an ethylene content (X2) of 44 mole percent, a saponification degree of 96.1 mole percent and an MFR of 15 g/10 min (210° C., load 2,160 g) in a water-methanol mixture [water/methanol mixing weight ratio=15/85, water content (Y2)=15%] were prepared. Thus, the water content (Y1) of the solvent in the mixed solution (1) was 35%, and substitution of the above ethylene content (X1=34 mole percent) into the formula (3) given hereinabove gave $50 \geq Y1 \geq 30$; hence, such water content (Y1) satisfied the conditions of formula (3). The water content (Y2) of the solvent in the mixed solution (2) was 15%, and substitution of the above ethylene content (X2=44 mole percent) into the formula (3) given hereinabove gave $30 \geq Y2 \geq 10$; hence, such water content (Y2) satisfied the conditions of formula (3).

To 75 parts of the above EVOH solution (1) was added gradually 25 parts of the EVOH solution (2) with stirring at 40° C., and the mixture was mixed up with stirring. Further, 3.5 parts of a 10% aqueous solution of sodium acetate was added and the mixture was stirred at 40° C. for 30 minutes, to give a water-methanol mixed solvent solution containing two EVOH species.

The mixed solution obtained was then extruded in the form of a strand into a coagulation bath comprising 5% of methanol and 95% of water and maintained at 5° C. through a nozzle (inside diameter 4 mm) to thereby cause precipitation (coagulation).

After completion of the coagulation, the strand-shaped matter was cut with a cutter, the thus-obtained white porous pellets were further introduced into 1,000 parts of warm water at 30° C. and the mixture was stirred for about 240 minutes to effect washing, to give hydrous EVOH pellets (water content 60%). These pellets were contacted with nitrogen gas in an atmosphere at 80° C. in a column type fluidized bed drier (empty column velocity 1.6 m/sec) for 40 minutes to give an EVOH composition (pellets) with a water content of 25% by weight.

Then, the EVOH composition pellets obtained were subjected to melt kneading in the same manner as in Example 24 to give EVOH composition pellets with a water content of 0.15% and a sodium acetate content of 100 ppm (as Na).

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 27

A solution (1) containing 40% of an EVOH species (A) with an ethylene content (X1) of 32 mole percent, a saponification degree of 99.5 mole percent and an MFR of 3.5 g/10 min (210° C., load 2,160 g) in a water-methanol mixture [water/methanol mixing weight ratio=50/50, water content (Y1)=50%], a solution (2) containing 40% of an EVOH species (B) with an ethylene content (X2) of 40 mole percent, a saponification degree of 99.5 mole percent and an MFR of 4.0 g/10 min (210° C., load 2,160 g) in a water-methanol mixture [water/methanol mixing weight ratio=25/75, water content (Y2)=25%] and a solution (3) containing 40% of an EVOH species (C) with an ethylene content (X3) of 49 mole percent, a saponification degree of 97.0 mole percent and an MFR of 30 g/10 min (210° C., load 2,160 g) in a water-methanol mixture [water/methanol mixing weight ratio=15/85, water content (Y3)=15%] were prepared. Thus, the water content (Y1) of the solvent in the mixed solution (1) was 50%, and substitution of the above ethylene content (X1=32 mole percent) into the formula (3) given hereinabove gave $56 \geq Y1 \geq 36$; hence, such water content (Y1) satisfied the conditions of formula (3). The water content (Y2) of the solvent in the mixed solution (2) was 25%, and substitution of the above ethylene content (X2=40 mole percent) into the formula (3) given hereinabove gave $35 \geq Y2 \geq 15$; hence, such water content (Y2) satisfied the conditions of formula (3). The water content (Y3) of the solvent in the mixed solution (3) was 15%, and substitution of the above ethylene content (X3=49 mole percent) into the formula (3) given hereinabove gave $26 \geq Y3 \geq 6$; hence, such water content (Y3) satisfied the conditions of formula (3).

To 65 parts of the above EVOH solution (1) were added gradually 20 parts of the EVOH solution (2) and 15 parts of the EVOH solution (3) with stirring at 40° C., and the mixture was mixed up with stirring. Further, 3.5 parts of a 10% aqueous solution of sodium acetate was added and the mixture was stirred at 40° C. for 30 minutes, to give a water-methanol mixed solvent solution containing three EVOH species.

The mixed solution obtained was then extruded in the form of a strand into a coagulation bath comprising 5% of methanol and 95% of water and maintained at 5° C. through a nozzle (inside diameter 4 mm) to thereby cause precipitation (coagulation).

After completion of the coagulation, the strand-shaped matter was cut with a cutter, the thus-obtained white porous pellets were further introduced into 1,000 parts of warm water at 30° C. and the mixture was stirred for about 240 minutes to effect washing, to give hydrous EVOH pellets (water content 60%). These pellets were contacted with nitrogen gas in an atmosphere at 75° C. in a column type fluidized bed drier (empty column velocity 1.6 m/sec) for 35 minutes to give an EVOH composition (pellets) with a water content of 30% by weight.

Then, the EVOH composition pellets obtained were subjected to melt kneading in the same manner as in Example 24 to give EVOH composition pellets with a water content of 0.20% and a sodium acetate content of 100 ppm (as Na).

Upon observation by the eye, the EVOH composition obtained was found colorless and transparent and no yellowing was observed at all. Such composition could be obtained efficiently at a rate of 55 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 28

An EVOH composition (pellets) with a water content of 0.22% was obtained in the same manner as in Example 24 except that, among the melt kneading conditions in the twin screw extruder, the extrusion temperature conditions were modified as shown in Table 4.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 29

An EVOH composition (pellets) with a water content of 0.20% was obtained in the same manner as in Example 24 except that, among the melt kneading conditions in the twin screw extruder, the extrusion temperature conditions were modified as shown in Table 4.

Upon observation by the eye, the EVOH composition obtained was found colorless and transparent and no yellowing was observed at all. Such composition could be obtained efficiently at a rate of 70 kg/hr. Further, said pelletizing procedure was conducted continuously for 10 hours; pellets were obtained stably without strand breakage; no foreign substance or mucous substance was found at all.

Using the pellets, mnultilayer structures were produced in the same manner as in Example 1 and the appearance, gas barrier properties and continuous moldability were evaluated in the same manner as in Example 1.

Example 30

An EVOH composition (pellets) with a water content of 0.20% was obtained in the same manner as in Example 24 except that the melt kneading conditions in the twin screw extruder were modified as shown in Table 4.

Upon observation by the eye, the EVOH composition obtained was found colorless and transparent and no yellowing was observed at all. Such composition could be obtained efficiently at a rate of 150 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 31

An EVOH composition (pellets) with a water content of 0.25% was obtained in the same manner as in Example 24 except that the melt kneading conditions in the twin screw extruder were modified as shown in Table 4.

Upon observation by the eye, the EVOH composition obtained was found colorless and transparent and no yellowing was observed at all. Such composition could be obtained efficiently at a rate of 10 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 32

An EVOH composition (pellets) with a water content of 0.28% was obtained in the same manner as in Example 24 except that a single screw extruder was used and that the melt kneading conditions were modified as shown in Table 4.

Upon observation by the eye, the EVOH composition obtained was found colorless and transparent and no yellowing was observed at all. Such composition could be obtained efficiently at a rate of 100kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 33

An EVOH composition (pellets) with a water content of 0.15% was obtained in the same manner as in Example 24 except that the white porous pellets obtained (coagulation/precipitation product from the mixed solution composed of EVOH solution (1) and EVOH solution (2)) were washed with a 0.5% aqueous solution of acetic acid and then introduced into an aqueous solution containing 0.1% of acetic acid, 0.03% of magnesium acetate and 0.02% of calcium acetate and the mixture was stirred at 30° C. for 5 hours to give hydrous EVOH pellets [100 ppm of acetic acid, 35 ppm (as Mg) of magnesium acetate and 20 ppm (as Ca) of calcium acetate being contained in the EVOH composition after drying].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Example 34

An EVOH composition (pellets) with a water content of 0.15% was obtained in the same manner as in Example 24 except that the white porous pellets obtained (coagulation/precipitation product from the mixed solution composed of EVOH solution (1) and EVOH solution (2)) were washed with warm water and then introduced into an aqueous solution containing 0.08% of boric acid and the mixture was stirred at 30° C. for 5 hours to give hydrous EVOH pellets [380 ppm (as boron) of boric acid being contained in the EVOH composition after drying].

Upon observation by the eye, the EVOH composition obtained was found colorless and transparent and no yellowing was observed at all. Such composition could be obtained efficiently at a rate of 50 kg/hr. Further, said pelletizing procedure was conducted continuously for 10 hours; pellets were obtained stably without strand breakage; no foreign substance or mucous substance was found at all.

Using the pellets, multilayer structures were produced in the same manner as in Example 1 and the appearance, gas barrier properties and continuous moldability were evaluated in the same manner as in Example 1.

Comparative Example 3

An EVOH composition (pellets) with a water content of 0.10% was obtained in the same manner as in Example 24 except that EVOH (A) and EVOH (B) were not blended in the form of solutions but dry pellets thereof (EVOH pellets (A) with a water content of 0.30% and EVOH pellets (B) with a water content of 0.25%) were dry-blended at a predetermined ratio together with sodium acetate and that the resulting mixture was fed to the twin screw extruder for melt kneading at 200° C.

Upon observation of the EVOH composition (pellets) obtained by the eye, slight discoloration (yellowing) was found. The rate of production of the EVOH composition was about 1 kg/hr and the production efficiency was thus poor.

Using the pellets, multilayer structures were produced in the same manner as in Example 1 and the appearance, gas barrier properties and continuous moldability were evaluated in the same manner as in Example 1.

The results of the appearance, gas barrier properties and continuous moldability evaluations as obtained in the above examples and comparative example are summarized in Table 5.

TABLE 5

|  | Appearance | Gas barrier properties | Continuous moldability |
|---|---|---|---|
| Example 24 | ○ | 0.31 | ⊚ |
| Example 25 | ○ | 0.31 | ⊚ |
| Example 26 | ○ | 0.44 | ⊚ |
| Example 27 | ○ | 0.34 | ⊚ |
| Example 29 | ○ | 0.31 | ⊚ |
| Example 29 | ○ | 0.31 | ⊚ |
| Example 30 | ○ | 0.31 | ⊚ |
| Example 31 | ○ | 0.31 | ⊚ |
| Example 32 | ○ | 0.32 | ○ |
| Example 33 | ○ | 0.31 | ⊚ |
| Example 34 | ○ | 0.30 | ⊚ |
| Compar. Ex. 3 | ○ | 0.33 | × |

Notes)
The gas barrier properties are represented by the oxygen permeability, $cc/m^2 \cdot day \cdot atm$.

Examples 35 to 44 and Comparative Example 4

In Examples 35 to 44, which are described below, the melt pelletization was carried out using a twin screw extruder under the conditions specified below in Table 6.

TABLE 6

| Conditions | Ex. 35 | Ex. 38 | Ex. 39 | Ex. 40 | Ex. 41 | Ex. 42 |
|---|---|---|---|---|---|---|
| Screw outside diameter (mm ø) | 57 | 57 | 57 | 83 | 30 | 75 |
| L/D | 44 | 44 | 44 | 30 | 42 | 36 |
| Strand die shape |  |  |  |  |  |  |
| Diameter (mm ø)/number of bores | 3.5/12 | 3.5/12 | 3.5/12 | 4.5/20 | 3.5/2 | 4.5/24 |
| Screen mesh (mesh) | 90/120/90 | 90/120/90 | 90/120/90 | 90/120/90 | 90/90 | 90/90 |
| Vent |  |  |  |  |  |  |
| Opened at | C5, C8 | C5, C8 | C5, C8 | C3 | C4 | C3 |
| Suctioned under vacuum at | C11 | C11 | C11 | C5 | C6 | C6 |
| Hopper sealing | $N_2$ | $N_2$ | $N_2$ | $N_2$ | $N_2$ | $N_2$ |
| Screw speed (rpm) | 100 | 100 | 100 | 200 | 120 | 200 |

TABLE 6-continued

| Conditions | Ex. 35 | Ex. 38 | Ex. 39 | Ex. 40 | Ex. 41 | Ex. 42 |
|---|---|---|---|---|---|---|
| Cylinder temperature as set (actually measured temperature) | | | | | | |
| C1 | 100° C. (100° C.) | 50° C. (50° C.) | 30° C. (31° C.) | 100° C. (100° C.) | 100° C. (100° C.) | 100° C. (97° C.) |
| C2 | 100° C. (100° C.) | 100° C. (100° C.) | 50° C. (50° C.) | 100° C. (100° C.) | 100° C. (99° C.) | 100° C. (99° C.) |
| C3 | 100° C. (100° C.) | 150° C. (145° C.) | 50° C. (62° C.) | 100° C. (100° C.) | 100° C. (100° C.) | 100° C. (99° C.) |
| C4 | 150° C. (146° C.) | 200° C. (197° C.) | 100° C. (97° C.) | 150° C. (163° C.) | 150° C. (143° C.) | 150° C. (158° C.) |
| C5 | 200° C. (199° C.) | 230° C. (228° C.) | 250° C. (241° C.) | 200° C. (220° C.) | 200° C. (198° C.) | 200° C. (218° C.) |
| C6 | 200° C. (178° C.) | 230° C. (227° C.) | 250° C. (241° C.) | 200° C. (222° C.) | 200° C. (195° C.) | 300° C. (275° C.) |
| C7 | 200° C. (191° C.) | 230° C. (227° C.) | 250° C. (249° C.) | | 200° C. (200° C.) | 300° C. (275° C.) |
| C8 | 200° C. (185° C.) | 230° C. (224° C.) | 250° C. (248° C.) | | | |
| C9 | 200° C. (198° C.) | 230° C. (229° C.) | 250° C. (250° C.) | | | |
| C10 | 200° C. (198° C.) | 230° C. (230° C.) | 250° C. (250° C.) | | | |
| C11 | 200° C. (196° C.) | 230° C. (230° C.) | 250° C. (251° C.) | | | |
| C12 | 200° C. (202° C.) | 230° C. (232° C.) | 250° C. (251° C.) | | | |
| C13 | 200° C. (204° C.) | 230° C. (232° C.) | 250° C. (252° C.) | | | |
| AD | 200° C. (200° C.) | 230° C. (230° C.) | 250° C. (250° C.) | 200° C. (220° C.) | 200° C. (200° C.) | 200° C. (270° C.) |
| D | 200° C. (199° C.) | 230° C. (229° C.) | 250° C. (250° C.) | 200° C. (220° C.) | 200° C. (200° C.) | 200° C. (270° C.) |
| $T_O/T_I$ (C13/C1) | 2.04 | 4.64 | 8.13 | | | |
| $T_M/T_F$ (C10–13/C1–4) | 1.79 | 1.88 | 4.18 | | | |
| $T_O/T_I$ (C6/C1) | | | | 2.22 | | |
| $T_M/T_F$ (C5–6/C1–2) | | | | 2.21 | | |
| $T_O/T_I$ (C7/C1) | | | | | 2.00 | 2.84 |
| $T_M/T_F$ (C6–7/C1–2) | | | | | 1.98 | 2.81 |
| Screw load (Amp) | 110 | 105 | 105 | 150 | 20 | 125 |
| Resin pressure (kg/cm$^2$) | 13 | 12 | 12 | 100 | 75 | 75 |

Example 35

Saponification was carried out at 110° C. over 2.5 hours by feeding 40 parts of a methanol solution containing 6% of sodium hydroxide and 2,500 parts of methanol continuously to 1,000 parts of a methanol solution containing 40% of an ethylene-vinyl acetate copolymer with an ethylene content of 40 mole percent while distilling off the byproduct methyl acetate and the excess methanol from the system, to give EVOH with a degree of saponification of the vinyl acetate moieties of 99.0 mole percent. After completion of the saponification reaction, the excess methanol was distilled off while feeding 450 parts of 30% water-methanol at an azeotropic point, to give an EVOH solution in a water-methanol mixture [water/methanol=30/70 (by weight), resin concentration 40%].

The EVOH solution (liquid temperature 50° C.) was then extruded, in the form of a strand, into a coagulation medium (composed of 95% of water and 5% of methanol) maintained at 5° C. through a nozzle having a bore size of 4 mm, to thereby cause the EVOH to coagulate in strand form. The strand-shaped EVOH was led to take-up rolls provided at the end of the water bath and then cut with a cutter to give white porous pellets with a diameter of 4 mm and a length of 4 mm (resin content 30%, water content 25%, methanol content 45%).

Further, the white porous pellets obtained were introduced into 1,000 parts of warm water at 30° C. and the mixture was stirred for about 240 minutes to effect washing. The thus-obtained hydrous EVOH pellets (water content 60%) were then contacted with nitrogen gas in an atmosphere at 80° C. for 40 minutes in a column type fluidized bed drier (empty column speed 1.6 m/sec) to give EVOH pellets with a water content of 25%.

Then, the EVOH pellets obtained were fed to a twin screw extruder equipped with a strand die and melt kneading was effected under the conditions mentioned below. The strand formed was passed through a water tank and thus cooled and then cut with a pelletizer to give EVOH pellets with a water content of 0.15%.

Upon observation by the eye, the EVOH pellets obtained were found colorless and transparent and no yellowing was observed at all. Such pellets could be obtained efficiently at a rate of 50 kg/hr. Further, said pelletizing procedure was conducted continuously for 10 hours; pellets could be dried stably without strand breakage; no foreign substance or mucous substance was found at all.

The melt pelletizing conditions in the twin screw extruder were as shown above in Table 6.

Example 36

EVOH pellets with a water content of 0.25% were obtained in the same manner as in Example 35 except that EVOH pellets (before melt kneading) with a water content of 50% were obtained by modifying the drying conditions in the column type fluidized bed drier.

Upon observation by the eye, the EVOH pellets obtained were found colorless and transparent and no yellowing was observed at all. Such pellets could be obtained efficiently at a rate of 50 kg/hr. Further, said pelletizing procedure was conducted continuously for 10 hours; pellets could be dried stably without strand breakage; no foreign substance or mucous substance was found at all.

Example 37

EVOH pellets with a water content of 0.20% were obtained in the same manner as in Example 35 except that EVOH pellets (before melt kneading) with a water content of 10% were obtained by modifying the drying conditions in the column type fluidized bed drier.

Upon observation by the eye, the EVOH pellets obtained were found colorless and transparent and no yellowing was observed at all. Such pellets could be obtained efficiently at a rate of 70 kg/hr. Further, said pelletizing procedure was conducted continuously for 10 hours; pellets could be dried stably without strand breakage; no foreign substance or mucous substance was found at all.

Example 38

EVOH pellets with a water content of 0.22% were obtained in the same manner as in Example 35 except that, among the melt kneading conditions in the twin screw extruder, the temperature conditions were modified as shown in Table 6.

Upon observation by the eye, the EVOH pellets obtained were found colorless and transparent and no yellowing was observed at all. Such pellets could be obtained efficiently at a rate of 70 kg/hr. Further, said pelletizing procedure was conducted continuously for 10 hours; pellets could be dried stably without strand breakage; no foreign substance or mucous substance was found at all.

Example 39

EVOH pellets with a water content of 0.20% were obtained in the same manner as in Example 35 except that, among the melt kneading conditions in the twin screw extruder, the temperature conditions were modified as shown in Table 6.

Upon observation by the eye, the EVOH pellets obtained were found colorless and transparent and no yellowing was observed at all. Such pellets could be obtained efficiently at a rate of 70 kg/hr. Further, said pelletizing procedure was conducted continuously for 10 hours; pellets could be dried stably without strand breakage; no foreign substance or mucous substance was found at all.

Example 40

EVOH pellets with a water content of 0.20% were obtained in the same manner as in Example 35 except that the melt kneading conditions in the twin screw extruder were modified as shown in Table 6.

Upon observation by the eye, the EVOH pellets obtained were found colorless and transparent and no yellowing was observed at all. Such pellets could be obtained efficiently at a rate of 150 kg/hr. Further, said pelletizing procedure was conducted continuously for 10 hours; pellets could be dried stably without strand breakage; no foreign substance or mucous substance was found at all.

Example 41

EVOH pellets with a water content of 0.25% were obtained in the same manner as in Example 35 except that the melt kneading conditions in the twin screw extruder were modified as shown in Table 6.

Upon observation by the eye, the EVOH pellets obtained were found colorless and transparent and no yellowing was observed at all. Such pellets could be obtained efficiently at a rate of 10 kg/hr. Further, said pelletizing procedure was conducted continuously for 10 hours; pellets could be dried stably without strand breakage; no foreign substance or mucous substance was found at all.

Example 42

EVOH pellets with a water content of 0.28% were obtained in the same manner as in Example 35 except that a single screw extruder was used and that the melt kneading conditions were modified as shown in Table 6.

Upon observation by the eye, the EVOH pellets obtained were found colorless and transparent and no yellowing was observed at all. Such pellets could be obtained efficiently at a rate of 100 kg/hr. Further, said pelletizing procedure was conducted continuously for 10 hours; pellets could be dried stably without strand breakage; no foreign substance or mucous substance was found at all.

Example 43

EVOH pellets with a water content of 0.15% were obtained in the same manner as in Example 35 except that the white porous pellets obtained were washed with a 0.5% aqueous solution of acetic acid and then introduced into an aqueous solution containing 0.1% of acetic acid, 0.03% of magnesium acetate and 0.02% of calcium acetate and the mixture was stirred at 30° C. for 5 hours to give hydrous EVOH pellets [100 ppm of acetic acid, 35 ppm (as magnesium) of magnesium acetate and 20 ppm (as calcium) of calcium acetate being contained in the EVOH after drying].

Upon observation by the eye, the EVOH pellets obtained were found colorless and transparent and no yellowing was observed at all. Such pellets could be obtained efficiently at a rate of 50 kg/hr. Further, said pelletizing procedure was conducted continuously for 10 hours; pellets could be dried stably without strand breakage; no foreign substance or mucous substance was found at all.

Example 44

EVOH pellets with a water content of 0.15% were obtained in the same manner as in Example 35 except that the white porous pellets obtained were washed with warm water and then introduced into an aqueous solution containing 0.08% of boric acid and the mixture was stirred at 30° C. for 5 hours to give hydrous EVOH pellets [380 ppm (as boron) of boric acid being contained in the EVOH after drying].

Upon observation by the eye, the EVOH pellets obtained were found colorless and transparent and no yellowing was observed at all. Such pellets could be obtained efficiently at a rate of 50 kg/hr. Further, said pelletizing procedure was conducted continuously for 10 hours; pellets could be dried stably without strand breakage; no foreign substance or mucous substance was found at all.

Comparative Example 4

EVOH pellets with a water content of 0.15% were obtained in the same manner as in Example 35 except that 60 kg of the hydrous EVOH pellets were charged into a hot air drier with a capacity of 200 liters and dried in an air stream at 65° C. until a water content of 30%, then at 85° C. until a water content of 30–10% and thereafter at 110° C. for 16 hours.

Upon observation of the EVOH pellets obtained by the eye, slight discoloration (yellowing) was found. The rate of production of the EVOH pellets was about 1 kg/hr and the production efficiency was thus poor.

What is claimed is:

1. A method of drying saponified ethylene-vinyl acetate copolymers which comprises melting and kneading a mixture comprising one or more saponified ethylene-vinyl acetate copolymer species and having a water content of 5 to 60% by weight until the mixture has a water content of less than 5% by weight.

2. A method of drying as claimed in claim 1 which comprises mixing two or more saponified ethylene-vinyl acetate copolymer species, each in solution, together and coagulating/precipitating the copolymer species as a saponified ethylene-vinyl acetate copolymer mixture with a water content of 5 to 60% by weight, and melting and kneading the copolymer mixture until the copolymer mixture has a water content of less than 5% by weight.

3. A method of drying as claimed in claim 1 which comprises mixing two or more ethylene-vinyl acetate copolymer species, each in solution, together, saponifying the copolymer species, then coagulating/precipitating the resulting saponified ethylene-vinyl acetate copolymers (EVOH species) as a mixture with a water content of 5 to 60% by weight and melting and kneading the mixture until the mixture has a water content of less than 5% by weight.

4. A method of drying as claimed in claim 1, wherein said step of melting and kneading comprises using an extruder and wherein the extruder cylinder temperature $T_I$ (°C.) at the hopper inlet and the extruder cylinder temperature $T_O$ (°C.) at the outlet satisfy the conditions specified by the formula given below:

$$1.1 \leq T_O/T_I < 10.$$

5. A method of drying as claimed in claim 1, wherein said step of melting and kneading comprises using an extruder and wherein the extruder feeding zone temperature $T_F$ (°C.) and the metering zone temperature $T_M$ (°C.) satisfy the conditions specified by the formula given below:

$$1.1 \leq T_M/T_F < 10.$$

6. A method of drying a saponified ethylene-vinyl acetate copolymer, comprising the step of:

melting and kneading a starting composition comprising a first saponified ethylene-vinyl acetate copolymer species and having a water content of 5 to 60% by weight, until the melted and kneaded composition has a water content of less than 5% by weight.

7. The method of claim 6, said starting composition further comprising a second saponified ethylene-vinyl acetate copolymer species.

8. The method of claim 7, further comprising the steps of:

mixing a solution of said first saponified ethylene-vinyl acetate copolymer species with a solution of said second saponified ethylene-vinyl acetate copolymer species to form a solution mixture; and coagulating or precipitating said solution mixture to form said starting composition.

9. The method of claim 7, further comprising the steps of:

mixing a solution of a first ethylene-vinyl acetate copolymer species with a solution of a second ethylene-vinyl acetate copolymer species to form a solution mixture;

saponifying the first and second ethylene-vinyl acetate copolymer species while in solution;

and coagulating or precipitating said solution mixture to form said starting composition.

10. The method of claim 8, said step of coagulating or precipitating said solution mixture comprising extruding the solution mixture into a coagulation medium to yield said starting composition in strand form.

11. The method of claim 9, said step of saponifying further comprising:

feeding the solution mixture and a solution of sodium hydroxide in methanol to a saponification column; and after completion of the saponification reaction, distilling off the excess of methanol while feeding a 30% by weight water in methanol solution to the reacted solution mixture.

12. The method of claim 6, said melting and kneading being performed until the melted and kneaded composition has a water content of less than 2% by weight.

13. The method of claim 6, said melting and kneading being performed until the melted and kneaded composition has a water content of less than 0.5% by weight.

14. The method of claim 7, said composition being prepared by blending the first and second saponified ethylene-vinyl acetate copolymer species, and the difference in water content between the first and second saponified ethylene-vinyl acetate copolymer species before blending being not more than 40 weight-%.

* * * * *